US012791674B2

(12) United States Patent
Murase

(10) Patent No.: US 12,791,674 B2
(45) Date of Patent: Nov. 10, 2026

(54) LIGHT RECEIVING DEVICE, DRIVE CONTROL METHOD THEREFOR, AND DISTANCE MEASURING DEVICE

(71) Applicant: SONY SEMICONDUCTOR SOLUTIONS CORPORATION, Kanagawa (JP)

(72) Inventor: Takuro Murase, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 951 days.

(21) Appl. No.: 17/998,303

(22) PCT Filed: May 6, 2021

(86) PCT No.: PCT/JP2021/017333

§ 371 (c)(1),
(2) Date: Nov. 9, 2022

(87) PCT Pub. No.: WO2021/235222

PCT Pub. Date: Nov. 25, 2021

(65) Prior Publication Data

US 2023/0341520 A1 Oct. 26, 2023

(30) Foreign Application Priority Data

May 19, 2020 (JP) ................................ 2020-087625

(51) Int. Cl.
*G01S 7/481* (2006.01)
*G01S 7/4863* (2020.01)

(52) U.S. Cl.
CPC .......... *G01S 7/4816* (2013.01); *G01S 7/4863* (2013.01)

(58) Field of Classification Search
CPC .... G01S 7/4816; G01S 7/4863; G01S 7/4914; G01S 17/36; G01S 17/42; G01S 17/894;
(Continued)

(56) References Cited

U.S. PATENT DOCUMENTS

2005/0092897 A1 5/2005 Schwarte
2010/0315540 A1 * 12/2010 Hoshino ............. H04N 25/778 341/122

(Continued)

FOREIGN PATENT DOCUMENTS

JP 2000-517427 12/2000
JP 2016-184868 10/2016

(Continued)

OTHER PUBLICATIONS

International Search Report and Written Opinion prepared by the Japan Patent Office on Jun. 8, 2021, for International Application No. PCT/JP2021/017333, 2 pgs.

*Primary Examiner* — Seung C Sohn
(74) *Attorney, Agent, or Firm* — SHERIDAN ROSS P.C.

(57) ABSTRACT

The present technology relates to a light receiving device capable of realizing high-speed transfer of charges, a drive control method therefor, and a distance measuring device. The light receiving device includes a pixel that transfers a charge generated in a photoelectric conversion unit to a predetermined FD in a case where a voltage of a predetermined value or more is simultaneously applied to gates of at least two transfer transistors. The present technology can be applied to, for example, a distance measuring module that measures a distance to a subject.

20 Claims, 19 Drawing Sheets

(58) Field of Classification Search
CPC ........ G01S 17/931; G01C 3/06; H04N 25/70; H04N 25/76
See application file for complete search history.

(56) References Cited

U.S. PATENT DOCUMENTS

| | | | | |
|---|---|---|---|---|
| 2018/0213174 | A1* | 7/2018 | Sano | H04N 25/778 |
| 2019/0096933 | A1* | 3/2019 | Kido | H10F 39/8027 |

FOREIGN PATENT DOCUMENTS

| | | |
|---|---|---|
| JP | 2019-004149 | 1/2019 |
| JP | 2020-009883 | 1/2020 |
| WO | WO 2019/093479 | 5/2019 |

* cited by examiner

FIG. 5

| | | |
|---|---|---|
| SW_A | TERMINAL X (ON) | BOTH TRANSFER TRANSISTORS 52A AND 52B ARE ON |
| | TERMINAL Y (OFF) | BOTH TRANSFER TRANSISTORS 52A AND 52B ARE OFF |
| | TERMINAL Z (VDD) | ONLY TRANSFER TRANSISTOR 52A IS ON |

| | | |
|---|---|---|
| SW_B | TERMINAL X (ON) | BOTH TRANSFER TRANSISTORS 52B AND 52C ARE ON |
| | TERMINAL Y (OFF) | BOTH TRANSFER TRANSISTORS 52B AND 52C ARE OFF |
| | TERMINAL Z (VDD) | ONLY TRANSFER TRANSISTOR 52C IS ON |

| | | |
|---|---|---|
| SW_C | TERMINAL X (ON) | BOTH TRANSFER TRANSISTORS 52C AND 52D ARE ON |
| | TERMINAL Y (OFF) | BOTH TRANSFER TRANSISTORS 52C AND 52D ARE OFF |
| | TERMINAL Z (VDD) | ONLY TRANSFER TRANSISTOR 52C IS ON |

| | | |
|---|---|---|
| SW_D | TERMINAL X (ON) | BOTH TRANSFER TRANSISTORS 52D AND 52A ARE ON |
| | TERMINAL Y (OFF) | BOTH TRANSFER TRANSISTORS 52D AND 52A ARE OFF |
| | TERMINAL Z (VDD) | ONLY TRANSFER TRANSISTOR 52A IS ON |

LIGHT RECEIVING DEVICE, DRIVE CONTROL METHOD THEREFOR, AND DISTANCE MEASURING DEVICE

CROSS REFERENCE TO RELATED APPLICATIONS

This application is a national stage application under 35 U.S.C. 371 and claims the benefit of PCT Application No. PCT/JP2021/017333, having an international filing date of 6 May 2021, which designated the United States, which PCT application claimed the benefit of Japanese Patent Application No. 2020-087625, filed 19 May 2020, the entire disclosures of each of which are incorporated herein by reference.

TECHNICAL FIELD

The present technology relates to a light receiving device, a drive control method therefor, and a distance measuring device, and more particularly, to a light receiving device capable of realizing high-speed transfer of charges, a drive control method therefor, and a distance measuring device.

BACKGROUND ART

A distance measuring sensor detects reflected light returned after irradiation light applied to an object is reflected by a surface of the object, and calculates a distance to the object on the basis of a flight time from irradiation of the irradiation light to reception of the reflected light. In the distance measuring sensor of an indirect ToF system, charges generated by photoelectrically converting received reflected light by a photodiode or the like are distributed to two charge storage units by a pair of transfer gates (MOS transistors), and a distance to an object is calculated from a ratio of the charge amounts (see, for example, Patent Document 1).

By driving the transfer gate responsible for distribution at a high speed and distributing the charge in a shorter period of time, the distance measurement accuracy can be remarkably improved.

CITATION LIST

Patent Document

Patent Document 1: Japanese Patent Application Laid-Open No. 2019-004149

SUMMARY OF THE INVENTION

Problems to be Solved by the Invention

However, since a predetermined time is required to apply a voltage necessary for charge transfer to the transfer gate, there is a limit to high-speed driving.

The present technology has been made in view of such a situation, and an object thereof is to realize high-speed transfer of charges.

Solutions to Problems

A light receiving device according to a first aspect of the present technology includes a pixel that transfers a charge generated in a photoelectric conversion unit to a predetermined FD in a case where a voltage of a predetermined value or more is simultaneously applied to gates of at least two transfer transistors.

In a drive control method for a light receiving device according to a second aspect of the present technology, a light receiving device including a pixel including at least two transfer transistors transfers a charge generated in a photoelectric conversion unit to a predetermined FD in a case where a voltage of a predetermined value or more is simultaneously applied to gates of at least two transfer transistors of the pixel.

A distance measuring device according to a third aspect of the present technology includes: a predetermined light source; and a light receiving device that receives reflected light obtained by reflecting irradiation light emitted from the predetermined light source by an object, in which the light receiving device includes a pixel that transfers a charge generated in a photoelectric conversion unit to a predetermined FD in a case where a voltage of a predetermined value or more is simultaneously applied to gates of at least two transfer transistors.

In the first to third aspects of the present technology, in a case where a voltage of a predetermined value or more is simultaneously applied to the gates of at least two transfer transistors of the pixel, the charge generated in the photoelectric conversion unit is transferred to a predetermined FD.

The light receiving device and the distance measuring device may be independent devices, or may be modules incorporated in other devices.

BRIEF DESCRIPTION OF DRAWINGS

FIG. 5 is a diagram of assistance in explaining an operation of a switch of FIG. 4.

MODE FOR CARRYING OUT THE INVENTION

Figure 1:
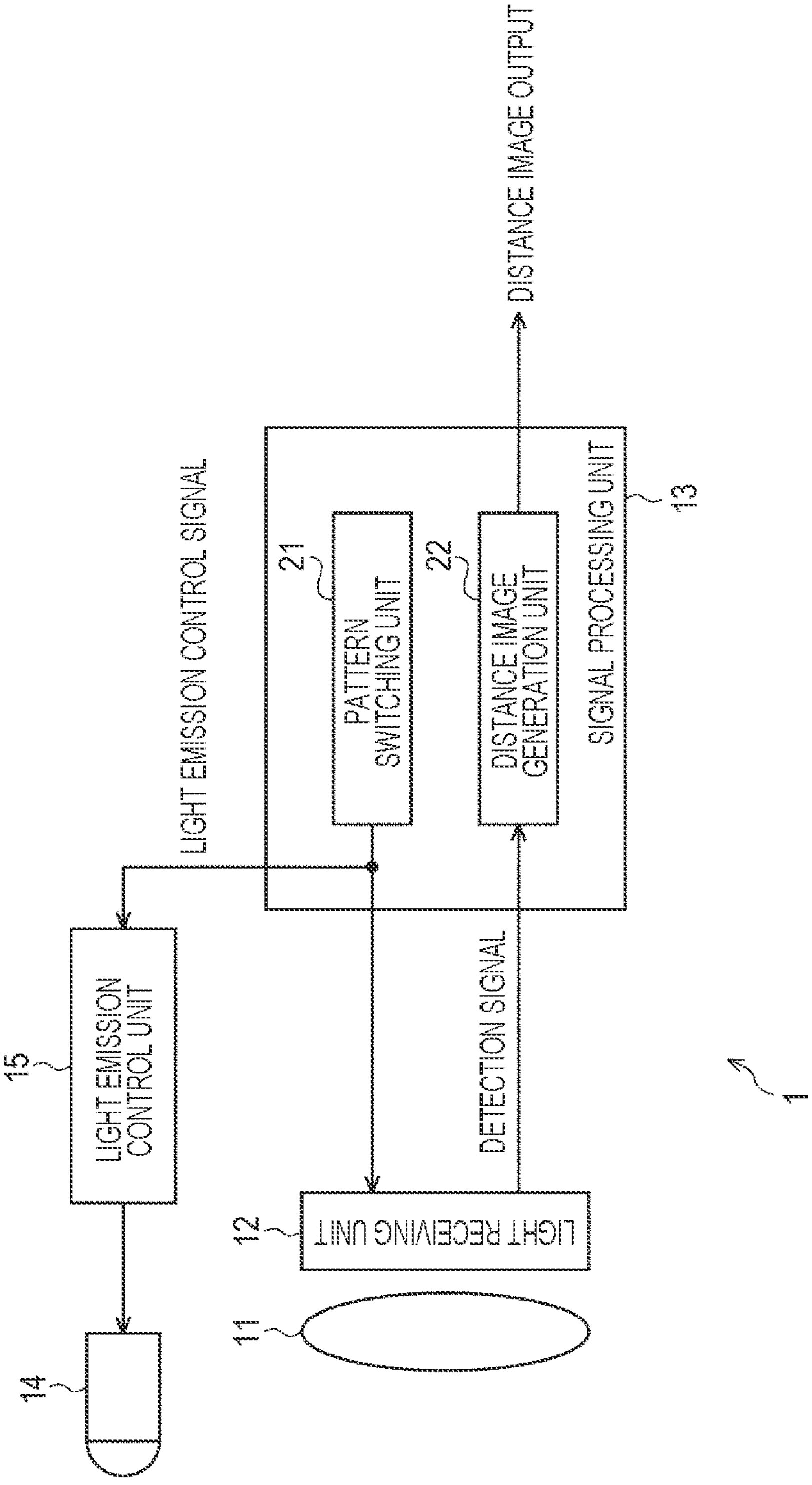
FIG. 1 is a block diagram depicting an example of configuration of a distance measuring device to which the present technology is applied.

Hereinafter, modes (hereinafter, referred to as embodiments) for carrying out the present technology will be described with reference to the accompanying drawings. Note that, in the present specification and the drawings, components having substantially the same functional configuration are denoted by the same reference numerals, and redundant description is omitted. The description will be given in the following order.

1. Configuration example of distance measuring device
2. Configuration of light receiving unit
3. Distance measurement principle of indirect ToF system
4. Detailed configuration example of pixel of light receiving unit
5. First drive control example of pixel
6. Modified example of pixel
7. Second drive control example of pixel
8. Third drive control example of pixel
9. Modified example of gate of transfer transistor
10. Configuration example of electronic apparatus
11. Application example to mobile body

1. Configuration Example of Distance Measuring Device

FIG. 1 is a block diagram depicting an example of configuration of a distance measuring device to which the present technology is applied.

A distance measuring device 1 in FIG. 1 is a device that performs distance measurement by the indirect ToF system, and includes a lens 11, a light receiving unit (light receiving device) 12, a signal processing unit 13, a light emitting unit 14, and a light emission control unit 15. The signal processing unit 13 includes a pattern switching unit 21 and a distance image generation unit 22. The distance measuring device 1 in FIG. 1 irradiates an object with light, receives light (reflected light) obtained by reflecting the light (irradiation light) by the object, and measures a distance to the object.

A light emitting system of the distance measuring device 1 includes a light emitting unit 14 and a light emission control unit 15. The light emitting unit 14 includes, for example, an infrared laser diode as a light source, emits light while modulating the light at a predetermined frequency (light emission pattern) according to a drive signal supplied from the light emission control unit 15, and irradiates an object with irradiation light (infrared light). The light emission control unit 15 causes the light emitting unit 14 to emit light in a predetermined light emission pattern on the basis of a light emission control signal from the pattern switching unit 21. The light emission control signal includes, for example, a pulse signal that repeats on and off at a predetermined frequency (for example, 20 MHz or the like).

The light emitting unit 14 may be arranged in a housing of the distance measuring device 1 or may be arranged outside the housing of the distance measuring device 1. An IR band filter may be provided between the lens 11 and the light receiving unit 12, and the light emitting unit 14 may emit infrared light corresponding to the transmission wavelength band of the IR band filter.

The light receiving unit 12 receives the reflected light incident through the lens 11 and outputs a detection signal based on the light reception result to the signal processing unit 13.

The pattern switching unit 21 of the signal processing unit 13 generates a light emission control signal that defines a light emission pattern when the light emitting unit 14 emits irradiation light, and supplies the light emission control signal to the light emission control unit 15. The pattern switching unit 21 also supplies a light emission control signal to the light receiving unit 12 in order to drive the light receiving unit 12 in accordance with the light emission pattern. For example, the pattern switching unit 21 can switch a plurality of light emission patterns so as not to overlap with light emission patterns of other distance measuring devices. Note that the pattern switching unit 21 may have a configuration in which the light emission pattern cannot be switched.

The distance image generation unit 22 of the signal processing unit 13 generates and outputs a distance image in which distance information to an object is stored for each pixel on the basis of the detection signal supplied from the light receiving unit 12. The distance image generation unit 22 functions as a calculation unit that calculates the distance from the distance measuring device 1 to the object.

2. Configuration of Light Receiving Unit

Figure 2:
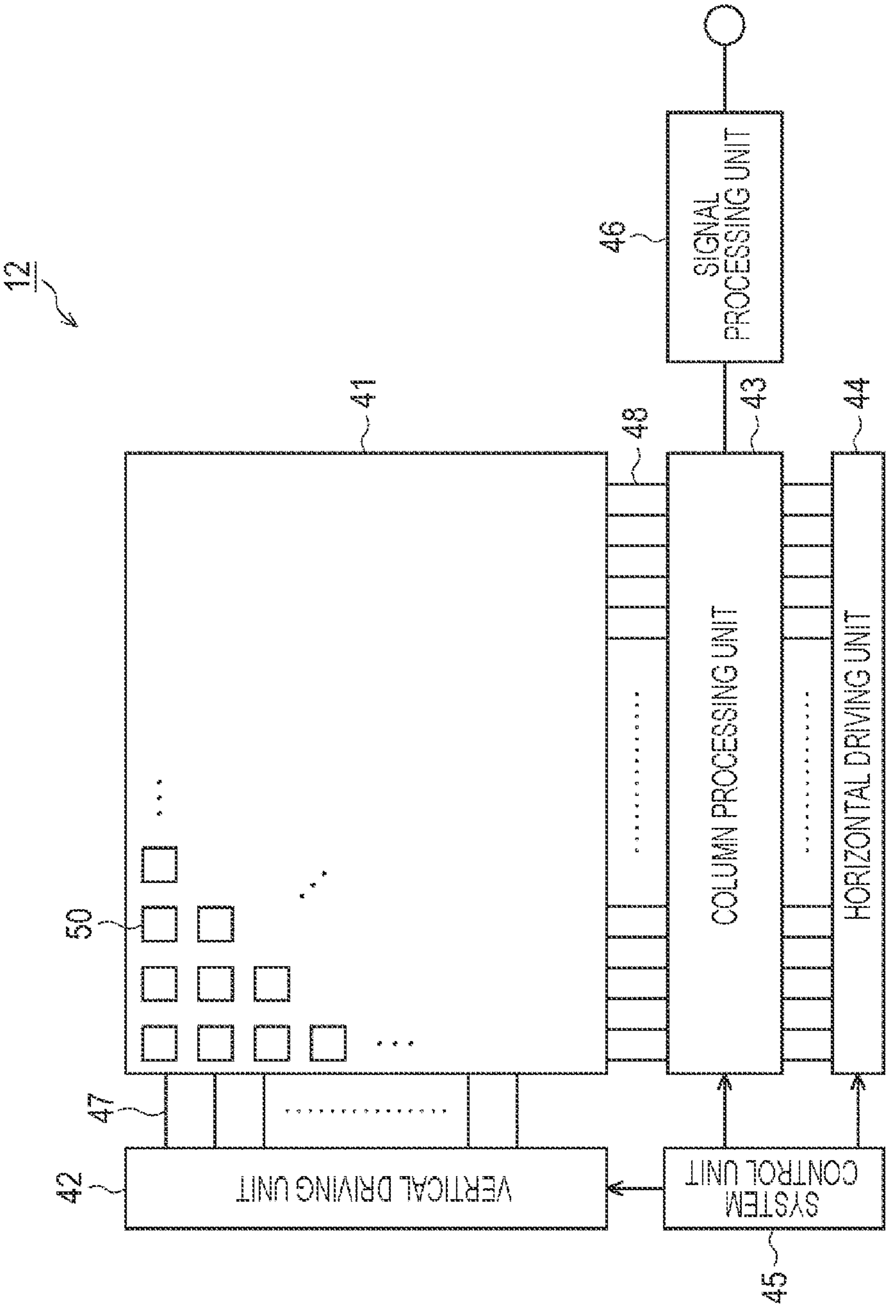
FIG. 2 is a block diagram depicting an example of configuration of a light receiving unit (light receiving device) in FIG. 1.

FIG. 2 is a block diagram depicting an example of configuration of the light receiving unit 12 in FIG. 1.

The light receiving unit 12 includes a pixel array unit 41, a vertical driving unit 42, a column processing unit 43, a horizontal driving unit 44, a system control unit 45, and a signal processing unit 46. For example, the pixel array unit 41, the vertical driving unit 42, the column processing unit 43, the horizontal driving unit 44, and the system control unit 45 are provided on a semiconductor substrate (chip) (not illustrated).

In the pixel array unit 41, pixels 50 each having a photoelectric conversion unit that generates a photoelectric charge of a charge amount corresponding to the amount of incident light and accumulates the photoelectric charge therein are two-dimensionally arranged in a matrix.

In the pixel array unit 41, a pixel drive line 47 is further provided for each row along the left-right direction (the array direction of the pixels in the pixel row) in the drawing with respect to the pixel array in the matrix form, and a vertical signal line 48 is provided for each column along the up-down direction in the drawing (the array direction of the pixels in the pixel column). One end of the pixel drive line 47 is connected to an output end corresponding to each row of the vertical driving unit 42.

The vertical driving unit 42 includes a shift register, an address decoder, and the like, and is a pixel driving unit that drives each pixel 50 of the pixel array unit 41 at the same time for all pixels or in units of rows. The detection signal output from each pixel 50 of the pixel row selectively scanned by the vertical driving unit 42 is supplied to the column processing unit 43 through each of the vertical signal lines 48. The column processing unit 43 performs predetermined signal processing on the detection signal input from each pixel 50 of the selected row via the vertical signal line 48 for each pixel column of the pixel array unit 41, and temporarily holds the detection signal after the signal processing. For example, the column processing unit 43 performs analog to digital (AD) conversion processing and the like as signal processing.

The horizontal driving unit 44 includes a shift register, an address decoder, and the like, and sequentially selects unit circuits corresponding to pixel columns of the column processing unit 43. By the selective scanning by the horizontal driving unit 44, the detection signals subjected to the signal processing by the column processing unit 43 are sequentially output to the signal processing unit 46.

The system control unit 45 includes a timing generator or the like that generates various timing signals, and performs drive control of the vertical driving unit 42, the column processing unit 43, the horizontal driving unit 44, and the like on the basis of the various timing signals generated in the timing generator.

The signal processing unit 46 has a predetermined arithmetic processing function, performs predetermined arithmetic processing on the detection signal output from the column processing unit 43 as necessary, and outputs the detection signal to the signal processing unit 13 (FIG. 1). Note that the signal processing unit 46 may include a function of executing processing performed by the signal processing unit 13 in FIG. 1. In this case, the light receiving unit 12 and the signal processing unit 13 can be configured by one device (light receiving device).

In the pixel array unit 41, the pixel drive line 47 is wired along the row direction for each pixel row, and the vertical signal line 48 is wired along the column direction for each pixel column with respect to the matrix-like pixel array. For example, the pixel drive line 47 transmits a drive signal for performing driving when reading the detection signal from each pixel 50. Note that, in FIG. 2, the pixel drive line 47 is illustrated as one wiring, but a plurality of wirings are actually formed. Similarly, in the vertical signal line 48, a plurality of wirings is formed for one pixel column.

3. Distance Measurement Principle of Indirect ToF System

Figure 3:
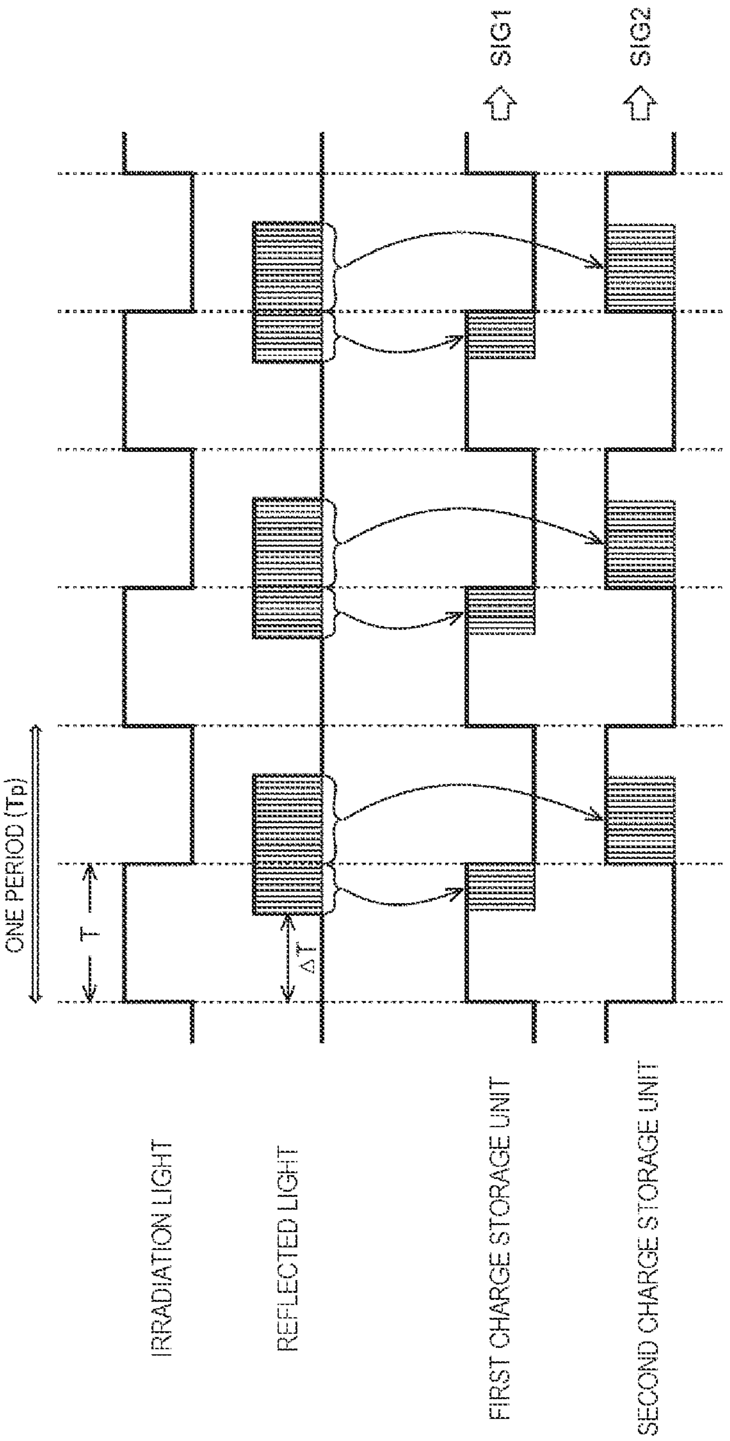
FIG. 3 is a diagram of assistance in explaining a distance measurement principle of an indirect ToF system.

Next, a detailed structure and driving of the pixel 50 of the light receiving unit 12 will be described, and before that, a distance measuring principle of the indirect ToF system will be briefly described with reference to FIG. 3. In FIG. 3, a case where two charge storage units that store charges obtained by photoelectric conversion of incident light are provided in one pixel will be described.

As illustrated in FIG. 3, irradiation light modulated so as to repeat on/off of light emission at an irradiation time T (one cycle Tp=2T) is output from a light source such as the light emitting unit 14, and the reflected light thereof is received by the pixel of the light receiving unit with a delay time ΔT corresponding to the distance to the object.

The pixel of the light receiving unit alternately distributes the charge obtained by photoelectrically converting the received reflected light to the first charge storage unit and the second charge storage unit. For example, the pixel of the light receiving unit transfers the charge to the first charge storage unit at the timing of the same phase as the irradiation light, and transfers the charge to the second charge storage unit at the timing of the phase inverted from the irradiation light. Such an operation of distributing charges obtained by photoelectric conversion to the first charge storage unit and the second charge storage unit is repeatedly executed in a predetermined charge storage period in which irradiation with irradiation light for the irradiation time T is periodically performed.

Then, after the charge accumulation period ends, a signal corresponding to the charge amount accumulated in the first charge accumulation unit is output as a detection signal SIG1, and a signal corresponding to the charge amount accumulated in the second charge accumulation unit is output as a detection signal SIG2.

The ratio between the detection signal SIG1 and the detection signal SIG2 corresponding to the ratio between the charge amount stored in the first charge storage unit and the charge amount stored in the second charge storage unit corresponds to the delay time ΔT. The delay time ΔT corresponds to the time during which the light emitted from the light source flies to the object, is reflected by the object, and then flies to the pixel of the light receiving unit, that is, corresponds to the distance to the object. Therefore, the distance (depth value) to the object can be obtained on the basis of the ratio between the detection signal SIG1 and the detection signal SIG2.

4. Detailed Configuration Example of Pixel of Light Receiving Unit

Next, details of the pixel 50 of the pixel array unit 41 of the light receiving unit 12 illustrated in FIG. 2 will be described.

Figure 4:
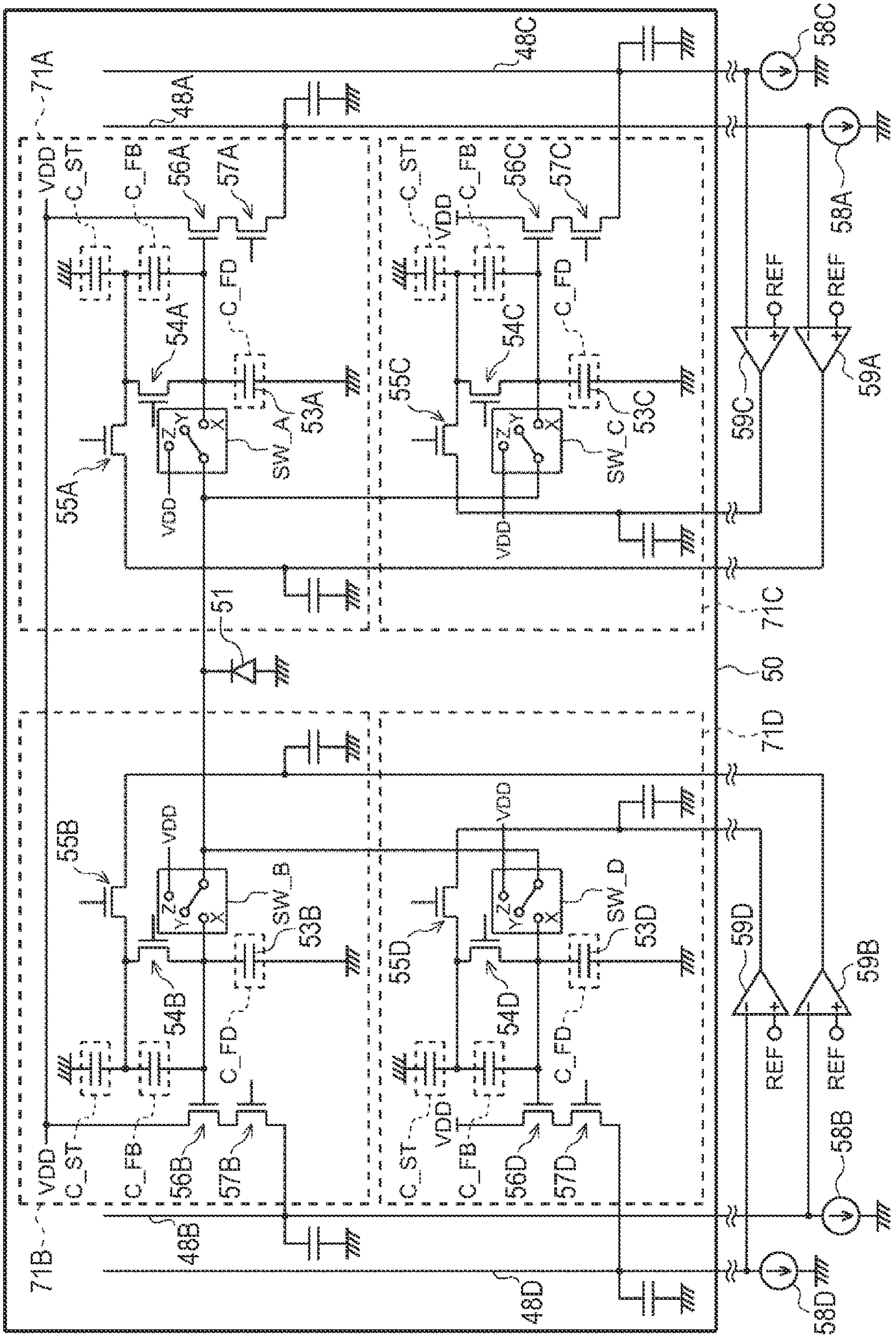
FIG. 4 is a diagram depicting an example of a circuit configuration of a pixel of the light receiving unit in FIG. 1.

FIG. 4 depicts a circuit configuration example of the pixel 50.

The pixel 50 in FIG. 4 is a pixel circuit having a pixel structure called a 4-tap structure in which four charge storage units that store charges obtained by photoelectrically converting reflected light are provided in one pixel.

Specifically, the pixel 50 includes a photodiode 51 (hereinafter, described as PD 51) as a photoelectric conversion unit, a first tap 71A, a second tap 71B, a third tap 71C, and a fourth tap 71D. Note that each of the first tap 71A to the fourth tap 71D will be simply referred to as a tap 71 unless otherwise distinguished. The pixel 50 is configured to distribute the charge generated in the PD 51 to the first tap 71A and the second tap 71B.

Each of the first tap 71A to the fourth tap 71D includes a switch SW, a floating diffusion (FD) 53, a reset transistor (RST) 54, a feedback enable transistor (FBEN) 55, an amplification transistor (AMP) 56, and a selection transistor (SEL) 57. Here, the switch SW is a switch whose connection destination is determined by the states of two transfer transistors 52 of a transfer transistor (TG) 52 of its own tap 71 and a transfer transistor (TG) 52 of another tap 71 adjacent in the plan view illustrated in FIG. 6. Therefore, each tap 71 also includes the transfer transistor 52.

The first tap 71A includes a switch SW_A, an FD 53A, a reset transistor 54A, a feedback enable transistor 55A, an amplification transistor 56A, and a selection transistor 57A. The second tap 71B includes a switch SW_B, an FD 53B, a reset transistor 54B, a feedback enable transistor 55B, an amplification transistor 56B, and a selection transistor 57B.

The third tap 71C includes a switch SW_C, an FD 53C, a reset transistor 54C, a feedback enable transistor 55C, an amplification transistor 56C, and a selection transistor 57C. The fourth tap 71D includes a switch SW_D, an FD 53D, a reset transistor 54D, a feedback enable transistor 55D, an amplification transistor 56D, and a selection transistor 57D.

Each pixel transistor of the transfer transistor 52 (FIG. 6), the reset transistor 54, the feedback enable transistor 55, the amplification transistor 56, and the selection transistor 57 includes, for example, an N-type MOS transistor, and is in an active state, that is, turned on in a case where a voltage (hereinafter, also referred to as Hi level) equal to or higher than a predetermined value is applied to the gate, and is in an inactive state, that is, turned off in a case where a voltage (hereinafter, also referred to as a Lo level) lower than a predetermined value such as GND is applied.

Constant current sources 58A to 58D and feedback amplifiers 59A to 59D illustrated in FIG. 4 are arranged outside the pixel array unit 41 such as the column processing unit 43 in FIG. 2, for example, and are shared with the other pixels 50 of the same pixel column, but are illustrated for the purpose of describing the operation.

Since the configurations of the first tap 71A to the fourth tap 71D are basically the same, the first tap 71A will be described below, the second tap 71B to the fourth tap 71D will be omitted, and supplementary description will be made as necessary.

A PD 51A is, for example, a photoelectric conversion element including a PN-junction photodiode, receives light (reflected light) obtained by reflecting irradiation light by an object, and generates and accumulates charges corresponding to the amount of received light by photoelectric conversion.

The switch SW_A is arranged between the PD 51 and the FD 53A, and connects the output destination of the PD 51 to one of the terminals X, Y, and Z in accordance with two on/off states of the transfer transistor 52A of the first tap 71A and the transfer transistor 52B of the second tap 71B.

Specifically, as illustrated in FIG. 5, in a case where both the transfer transistors 52A and 52B are turned on, the switch SW_A selects the terminal X and transfers the charge accumulated in the PD 51 to the FD 53A. On the other hand, in a case where both the transfer transistors 52A and 52B are turned off, the terminal Y is selected, and the switch SW_A is turned off (opened). Furthermore, in a case where only the transfer transistor 52A is turned on, the switch SW_A selects the terminal Z to which the voltage VDD is supplied, and discharges the charge accumulated in the PD 51.

The FD 53A is a charge holding unit that temporarily holds the charge transferred from the PD 51A. The capacitance value of the FD 53A is C_FD. The charge held in the FD 53A is converted into an electric signal (for example, the voltage signal) and output to a vertical signal line 48A via the amplification transistor 56A and the selection transistor 57A. A drain of the transfer transistor 52A, a gate of the amplification transistor 56A, and a source of the reset transistor 54A are connected to the FD 53A.

The reset transistor 54A is a reset unit that initializes (resets) the FD 53A to a reset voltage when turned on by a drive signal supplied to the gate. A source of the reset transistor 54A is connected to the FD 53A, and a drain thereof is connected to a source of the feedback enable transistor 55A. The drain of the reset transistor 54A forms a parasitic capacitance C_ST with the ground, and forms a parasitic capacitance (pixel coupling capacitance) C_FB with the gate of the amplification transistor 56A.

The feedback enable transistor 55A is a reset voltage control unit that controls a reset voltage supplied to the reset transistor 54A. The source of the feedback enable transistor 55A is connected to the drain of the reset transistor 54A, and the drain of the feedback enable transistor 55A is connected to the output of the feedback amplifier 59A.

When turned on by a drive signal supplied to the gate, the feedback enable transistor 55A supplies the REF voltage supplied from the feedback amplifier 59A as a reset voltage to the reset transistor 54A or the parasitic capacitance C_FB. When the feedback enable transistor 55A is turned on, a feedback loop is formed by the feedback enable transistor 55A, the reset transistor 54A or the parasitic capacitance C_FB, the amplification transistor 56A, the selection transistor 57A, and the feedback amplifier 59A, so that reset noise (kTC noise) generated in the reset transistor 54A is canceled.

The amplification transistor 56A outputs a detection signal corresponding to the potential of the FD 53A. That is, the amplification transistor 56A configures a source follower circuit with a constant current source 58A configured by a load MOS or the like, and an electric signal indicating a level (voltage) corresponding to the charge held in the FD 53A is output as a detection signal to the vertical signal line 48A via the selection transistor 57A. The connection destination of the vertical signal line 48A is the column processing unit 43 (FIG. 2).

The selection transistor 57A is arranged between the amplification transistor 56A and the vertical signal line 48A, and when turned on by a drive signal supplied to the gate, outputs a detection signal supplied from the amplification transistor 56A to the vertical signal line 48A. The detection signal output to the vertical signal line 48A is supplied to the column processing unit 43.

The drive signals supplied to the gates of the transfer transistors 52A and 52B, the reset transistor 54A, the feedback enable transistor 55A, and the selection transistor 57A are supplied from the vertical driving unit 42 via the pixel drive line 47.

The first tap 71A is configured as described above.

The second tap 71B is also basically configured similarly to the first tap 71A, but the configuration of the switch SW_B is different.

The switch SW_B is arranged between the PD 51 and the FD 53B, and connects the output destination of the PD 51 to one of the terminals X, Y, and Z in accordance with two on/off states of the transfer transistor 52B of the second tap 71B and the transfer transistor 52C of the third tap 71C.

Specifically, as illustrated in FIG. 5, in a case where both the transfer transistors 52B and 52C are turned on, the switch SW_B selects the terminal X and transfers the charge accumulated in the PD 51 to the FD 53B. On the other hand, in a case where both the transfer transistors 52B and 52C are turned off, the terminal Y is selected, and the switch SW_B is turned off (opened). Furthermore, in a case where only the transfer transistor 52C is turned on, the switch SW_B selects the terminal Z to which the voltage VDD is supplied, and discharges the charge accumulated in the PD 51.

The third tap 71C is also basically configured similarly to the first tap 71A, but the configuration of the switch SW_C is different.

The switch SW_C is arranged between the PD 51 and the FD 53C, and connects the output destination of the PD 51 to one of the terminals X, Y, and Z in accordance with two on/off states of the transfer transistor 52C of the third tap 71C and the transfer transistor 52D of the fourth tap 71D.

Specifically, as illustrated in FIG. 5, in a case where both the transfer transistors 52C and 52D are turned on, the switch SW_C selects the terminal X and transfers the charge accumulated in the PD 51 to the FD 53C. On the other hand, in a case where both the transfer transistors 52C and 52D are turned off, the terminal Y is selected, and the switch SW_C is turned off (opened). Furthermore, in a case where only the transfer transistor 52C is on, the switch SW_C selects the terminal Z to which the voltage VDD is supplied, and discharges the charge accumulated in the PD 51.

The fourth tap 71D is also basically configured similarly to the first tap 71A, but the configuration of the switch SW_D is different.

The switch SW_D is arranged between the PD 51 and the FD 53D, and connects the output destination of the PD 51 to one of the terminals X, Y, and Z in accordance with two on/off states of the transfer transistor 52D of the fourth tap 71D and the transfer transistor 52A of the first tap 71A.

Specifically, as illustrated in FIG. 5, in a case where both the transfer transistors 52D and 52A are turned on, the switch SW_D selects the terminal X and transfers the charge accumulated in the PD 51 to the FD 53D. On the other hand, in a case where both the transfer transistors 52D and 52A are turned off, the terminal Y is selected, and the switch SW_D is turned off (opened). Furthermore, in a case where only the transfer transistor 52A is turned on, the switch SW_D selects the terminal Z to which the voltage VDD is supplied, and discharges the charge accumulated in the PD 51.

Note that the pixel circuit depicted in FIG. 4 is an example of a circuit of the pixel 50, and other circuit configurations can be used. For example, an additional capacitance for adding a capacitance to the FD 53 and an additional capacitance connection transistor for turning on and off the connection between the additional capacitance and the FD 53 may be added to each tap 71. By providing the additional capacitance, the conversion efficiency (light receiving sensitivity) of the FD can be changed corresponding to the amount of received light.

In a case of the 2-tap structure including two charge storage units in one pixel, as described with reference to FIG. 3, the charge generated in the photoelectric conversion unit is alternately distributed to the two charge storage units. However, in a case of the 4-tap structure such as the pixel 50, as described later, for example, the charge generated in the photoelectric conversion unit can be distributed to the four charge storage units (FDs 53A to 53D).

Figure 6:
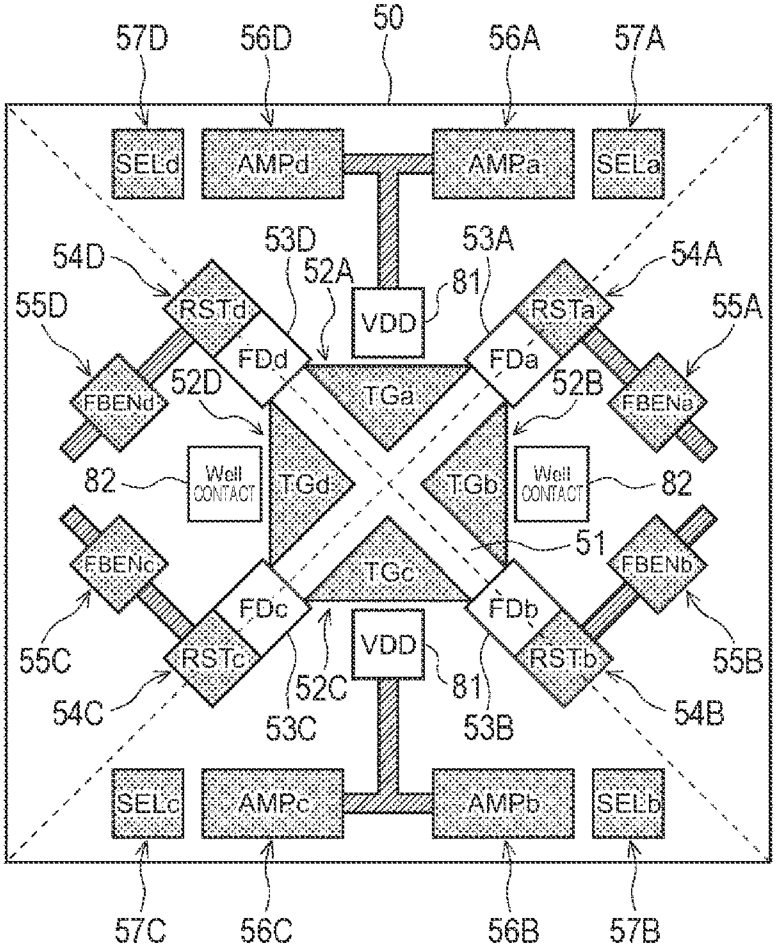
FIG. 6 is a plan view of a pixel transistor forming surface of the pixel in FIG. 4.

FIG. 6 is a plan view of a pixel transistor formation surface of the pixel 50 formed on the semiconductor substrate.

A rectangular PD 51 is formed in a semiconductor substrate in a region near the center of the rectangular pixel 50, and the transfer transistors 52 of the first tap 71A to the fourth tap 71D, that is, the gates TGa to TGd of the transfer transistors 52A to 52D are formed on the upper surface of the rectangular PD 51.

Each of the gates TGa to TGd of the transfer transistors 52A to 52D is formed in a substantially right-angled isosceles triangle shape, and is arranged such that a 90 degree corner of the substantially right-angled isosceles triangle is on a center point side of the rectangular PD 51, other two 45 degree corners are on four corner sides of the rectangular PD 51, and sides having a maximum length to be oblique sides of the substantially right-angled isosceles triangle overlap four sides of an outer periphery of the rectangular PD 51.

The right-angled triangular gates TGa to TGd are arranged to be separated from each other with diagonal regions having a predetermined width with each of two diagonals connecting diagonals of four corners of the rectangular PD 51 as center lines as gap regions of the adjacent transfer transistors 52.

Outside the rectangular PD 51, the pixel transistors other than the transfer transistors 52 of the first tap 71A to the fourth tap 71D and the FDs 53 are arranged line-symmetrically with respect to the center line of the rectangular pixel region in the vertical (vertical) direction or the horizontal (horizontal) direction.

Any of the diffusion layers FDa to FDd to be the FDs 53A to 53D is arranged outside the corner portions of the four corners of the rectangular PD 51. The reset transistors 54 and the feedback enable transistors 55 corresponding to the respective taps 71 are arranged outside the FDs 53A to 53D (diffusion layers FDa to FDd). For example, the reset transistor 54A and the feedback enable transistor 55A are arranged outside the FD 53A (diffusion layer FDa) of the first tap 71A.

In addition, either a VDD contact 81 which is a contact portion of a predetermined voltage VDD or a well contact 82 which is a contact portion of a well layer is arranged outside the four sides of the rectangular PD 51. More specifically, the VDD contacts 81 are arranged outside the gates TGa and TGc of the transfer transistors 52A and 52C, the well contacts 82 are arranged outside the gates TGb and TGd of the transfer transistors 52B and 52D, and the two VDD contacts 81 or the two well contacts 82 are arranged to face each other.

On one of the two VDD contacts 81 arranged to face each other, a gate AMPa of the amplification transistor 56A of the first tap 71A, a gate SELa of the selection transistor 57A, a gate AMPd of the amplification transistor 56D of the fourth tap 71D, and a gate SELd of the selection transistor 57D are arranged, and drains (not illustrated) of the amplification transistors 56A and 56D are connected to the VDD contact 81.

On the other of the two VDD contacts 81 arranged to face each other, a gate AMPb of the amplification transistor 56B of the second tap 71B, a gate SELb of the selection transistor 57B, a gate AMPc of the amplification transistor 56C of the third tap 71C, and a gate SELc of the selection transistor 57C are arranged, and drains (not illustrated) of the amplification transistors 56B and 56C are connected to the VDD contact 81.

5. First Drive Control Example of Pixel

The first drive control of the pixel 50 configured as illustrated in FIG. 6 will be described with reference to FIGS. 7 and 8.

Figure 7:
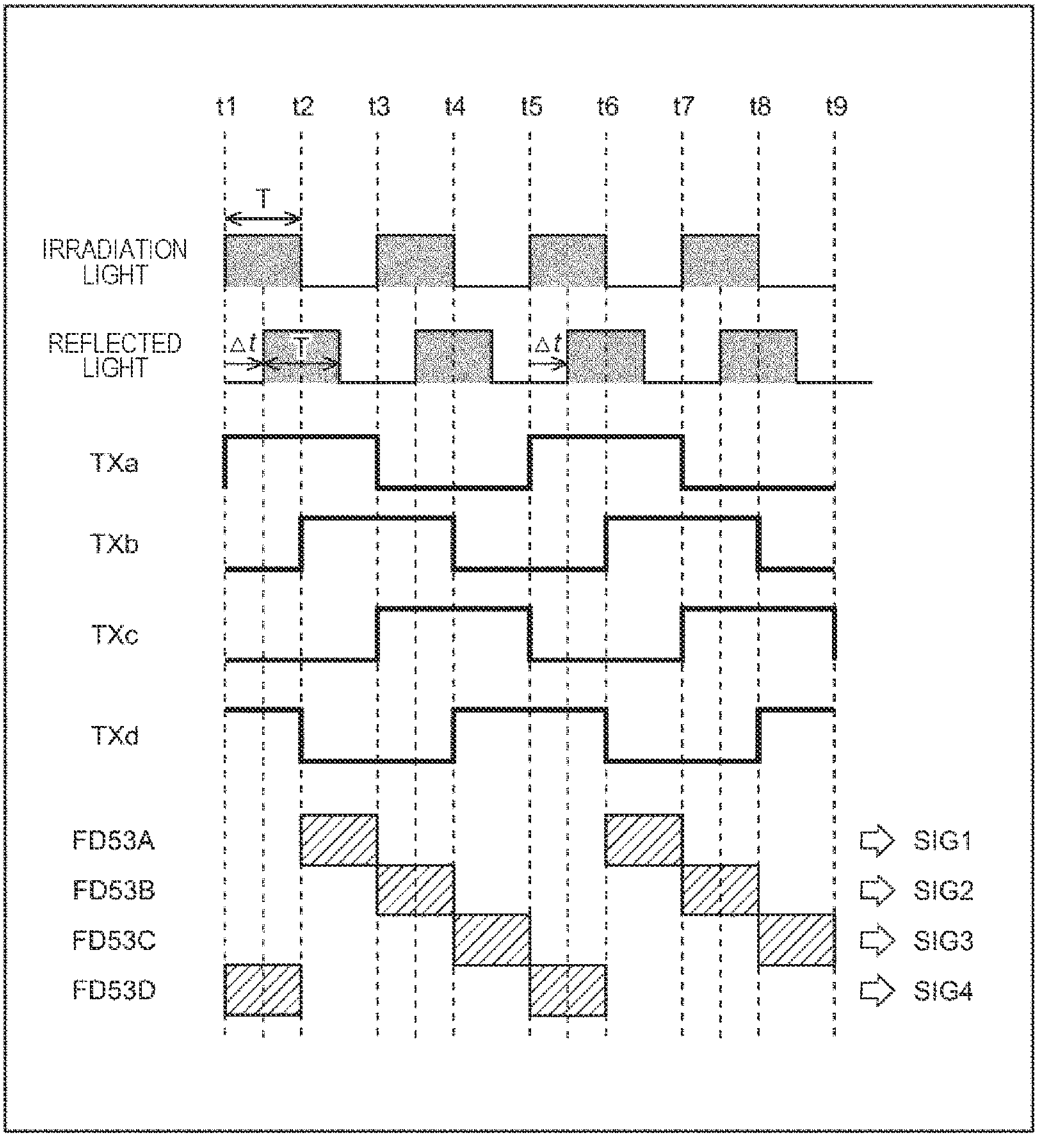
FIG. 7 is a timing chart depicting first drive control of the pixel in FIG. 6.
Figure 8:
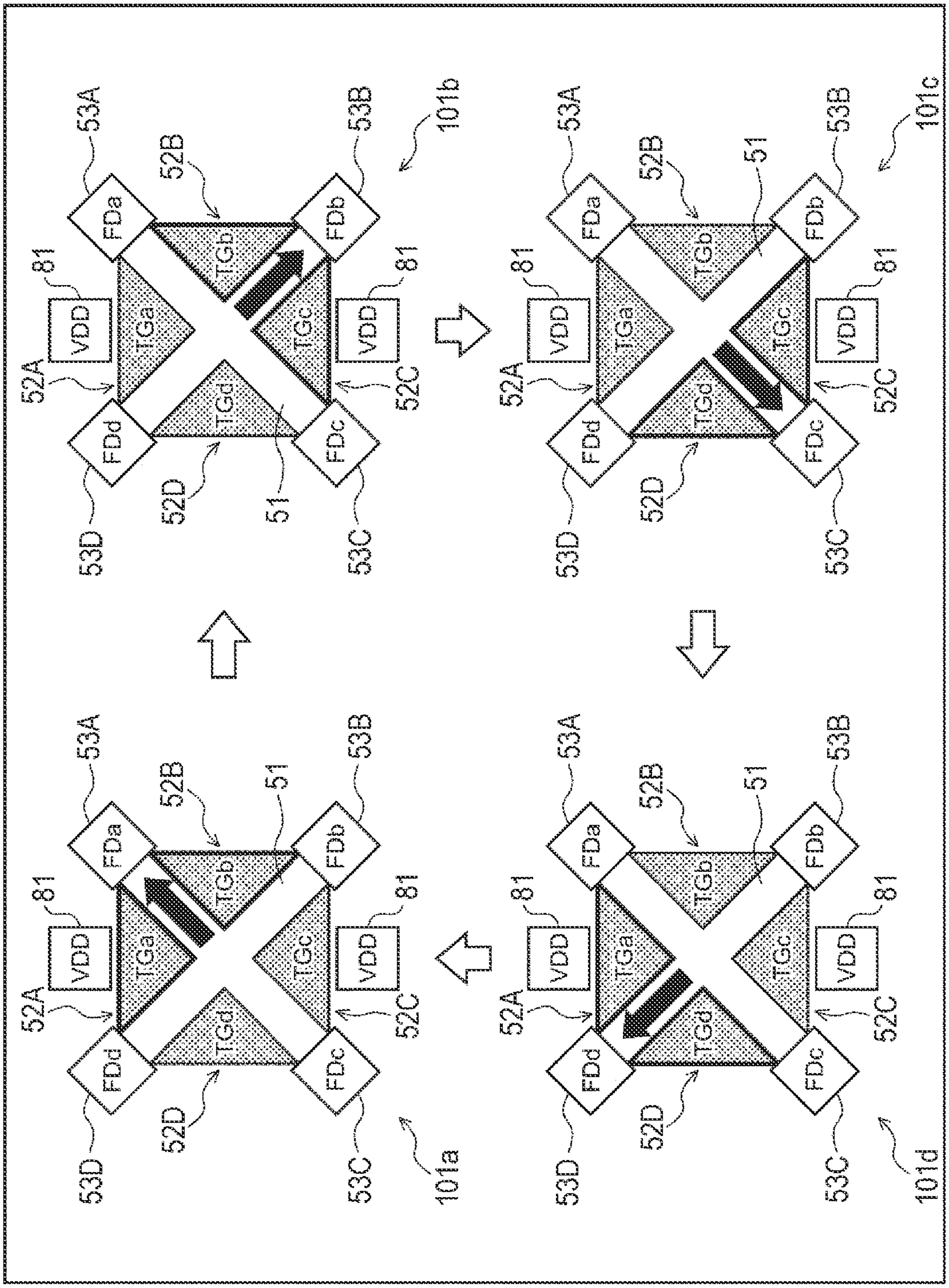
FIG. 8 is a plan view of a part of a pixel for explaining an operation state.

FIG. 7 is a timing chart depicting the first drive control during the charge accumulation period of the pixel 50, and FIG. 8 is a plan view depicting an operation state of the pixel 50 at a predetermined timing in FIG. 7.

The light emitting unit 14 starts light emission at time t1 in FIG. 7, and irradiates an object with irradiation light while repeating on/off of light emission for each irradiation time T. The first light emission start of the light emitting unit 14 is set as time t1, and times t2, t3, t4, . . . are set for each irradiation time T. The reflected light obtained by reflecting the irradiation light by the object reaches the pixel 50 of the light receiving unit 12 and is received after the delay time ΔT from the emission of the light emitting unit 14.

As illustrated in FIG. 7, the vertical driving unit 42 controls each transfer transistor 52 such that each transfer transistor 52 of the first tap 71A to the fourth tap 71D repeats on/off for a time (2T) that is twice the irradiation time T of the irradiation light, and the transfer transistors 52A to 52D are turned on with the ON period shifted by half.

Specifically, the vertical driving unit 42 sets a transfer control signal TXa for controlling the transfer transistor 52A of the first tap 71A to a Hi level in the period from time t1 to time t3, and turns on the transfer transistor 52A of the first tap 71A. For the transfer transistor 52B of the second tap 71B, the vertical driving unit 42 sets a transfer control signal TXb for controlling the transfer transistor 52B to a Hi level in the period from time t2 to time t4, and turns on the transfer transistor 52B. Subsequently, the vertical driving unit 42 sets a transfer control signal TXc for controlling the transfer transistor 52C of the third tap 71C to a Hi level in the period from time t3 to time t5, and turns on the transfer transistor 52C. Furthermore, the vertical driving unit 42 sets a transfer control signal TXd for controlling the transfer transistor 52D of the fourth tap 71D to a Hi level in the period from time t4 to time t6, and turns on the transfer transistor 52D. At time t5, the vertical driving unit 42 again sets the transfer control signal TXa for controlling the transfer transistor 52A of the first tap 71A to the Hi level, and turns on the transfer transistor 52A of the first tap 71A in the period from time t5 to time t7. The vertical driving unit 42 repeats the same process hereinafter.

As described above, the vertical driving unit 42 sets the ON period of each transfer transistor 52 of the first tap 71A to the fourth tap 71D to the time (2T) that is twice the irradiation time T, shifts the ON period by half such that the adjacent transfer transistors 52 are turned on at the same time (T time) as the irradiation time T, and drives the transfer transistors 52A to 52D to be sequentially turned on.

As a result, for example, in a T period from time t2 to time t3, since the transfer transistor 52A of the first tap 71A and the transfer transistor 52B of the second tap 71B are simultaneously turned on, the switch SW_A is in a state of being connected to the terminal X, and the charge generated in the PD 51 is transferred to the FD 53A (diffusion layer FDa) of the first tap 71A through the gap region between the gate TGa of the transfer transistor 52A and the gate TGb of the transfer transistor 52B as in the state 101*a* of FIG. 8. In FIG. 8, the transfer transistor 52 in which the outer peripheral portions of the gates TGa to TGd are thick lines is in an on state, and the transfer transistor 52 in which the outer peripheral portions are thin lines is in an off state.

In a T period from the next time t3 to time t4, since the transfer transistor 52B of the second tap 71B and the transfer transistor 52C of the third tap 71C are simultaneously turned on, the switch SW_B is in a state of being connected to the terminal X, and the charge generated in the PD 51 is transferred to the FD 53B (diffusion layer FDb) of the second tap 71B through the gap region between the gate TGb of the transfer transistor 52B and the gate TGc of the transfer transistor 52C as in the state 101*b* of FIG. 8.

In a T period from the next time t4 to time t5, since the transfer transistor 52C of the third tap 71C and the transfer transistor 52D of the fourth tap 71D are simultaneously turned on, the switch SW_C is in a state of being connected to the terminal X, and the charge generated in the PD 51 is transferred to the FD 53C (diffusion layer FDc) of the third tap 71C through the gap region between the gate TGc of the transfer transistor 52C and the gate TGd of the transfer transistor 52D as in the state 101*c* of FIG. 8.

In a T period from the next time t5 to time t6, since the transfer transistor 52D of the fourth tap 71D and the transfer transistor 52A of the first tap 71A are simultaneously turned on, the switch SW_D is in a state of being connected to the terminal X, and the charge generated in the PD 51 is transferred to the FD 53D (diffusion layer FDd) of the fourth tap 71D through the gap region between the gate TGd of the transfer transistor 52D and the gate TGa of the transfer transistor 52A as in the state 101*d* of FIG. 8.

Similarly, the state transitions in order of states 101*a*, 101*b*, 101*c*, and 1010*d* until the charge accumulation period ends, and the charges generated in the PD 51 are distributed to the FDs 53A to 53D of the first tap 71A to the fourth tap 71D.

When the charge accumulation period ends, the pixel 50 enters a signal reading period, and signals corresponding to the charge amounts accumulated in the FDs 53A to 53D of the first tap 71A to the fourth tap 71D are output to the column processing unit 43 as detection signals SIG1 to SIG4, respectively.

As illustrated in the lower part of FIG. 7, the charge accumulation periods of the FD 53B and the FD 53D have the same phase as the irradiation light, and the charge accumulation periods of the FD 53A and the FD 53D have an inverted phase with the irradiation light. Therefore, the distance to the object can be obtained on the basis of the ratio between the detection signal (SIG1+SIG3) and the detection signal (SIG2+SIG4). Note that the distance can be obtained only by the ratio between the detection signals SIG1 and SIG2 or the ratio between the detection signals SIG2 and SIG4.

Although not illustrated, in the signal reading period, the transfer transistor 52A of the first tap 71A and the transfer transistor 52C of the third tap 71C are turned on. As a result, all of the switches SW_A to SW_D are in a state of being connected to the terminal Z, and surplus charges generated in the PD 51 in the period other than the charge accumulation period are discharged to the two VDD contacts 81 in FIG. 6.

<Effects of First Drive Control>

The FDs 53A to 53D in the lower part of FIG. 7 illustrate charge accumulation periods of the FDs 53A to 53D, and one charge accumulation period of each FD 53 is T time, which is half of the ON period (2T) of the transfer transistor 52. Therefore, charge transfer is realized at a frequency that is twice a drive frequency of the transfer transistor 52.

It is known that distance measurement accuracy is improved by driving the transfer transistor 52 that distributes the charges generated in the PD 51 at a high speed and distributing the charges in a shorter period of time.

However, since a predetermined time is required to sufficiently apply a voltage necessary for charge transfer, there is a limit to high-speed driving.

According to the first drive control using the 4-tap structure of the pixel 50 described above, the charges can be distributed in a period of ½ of the drive period of the transfer transistor 52, and high-speed transfer of the charge can be more easily realized.

Furthermore, since the charge is transferred to one FD 53 by simultaneously turning on the two transfer transistors 52, the voltage applied to the gate TG of each of the transfer transistors 52 can be made lower than that in the case of the pixel PX, and the influence of the dark current under the gate TG can be alleviated.

<Effects of Pixel Structure in FIG. 6>

Effects of the pixel structure of the pixel 50 in FIG. 6 will be described.

In the pixel 50, the center of the rectangular PD 51 is arranged at the center portion of the pixel region, and the gates TGa to TGd of the four transfer transistors 52A to 52D and the inter-gate region serving as the charge transfer path are symmetrically arranged starting from the center of the PD 51. As a result, the transfer variation from the deep portion of the PD 51 can be made uniform in the four transfer transistors 52A to 52D.

Furthermore, in the pixel 50, the FDs 53A to 53D are arranged at the corner portions of the four corners instead of the side central portion of the outer periphery of the rectangular PD 51. In this case, since the FDs 53A to 53D are located farthest from the center of the PD 51 at a distance 42 times longer than that in the case of being placed at the central portion of the side, it is possible to achieve a structure in which incident light is less likely to directly leak into the FDs 53A to 53D. Note that the FDs 53A to 53D are preferably arranged at the corner portions of the four corners, but may be arranged at the center of the side of the rectangular PD 51 for other reasons or the like.

Furthermore, in the pixel 50, the planar shape of each of the gates TGa to TGd of the four transfer transistors 52A to 52D is a right-angled triangular shape (right-angled isosceles triangle shape), and the right-angled portion of the right-angled triangular shape is arranged on the central portion side of the rectangular PD 51. As a result, the central portion side of the PD 51 becomes a wide region of the gate TG of the transfer transistor 52, and the FD 53 side becomes a narrow region of the gate TG of the transfer transistor 52, and the modulation capability when the transfer transistor 52 is turned on can be increased toward the central portion side of the PD 51 which is a wide region of the gate TG, and an electric field gradient in which electric charge easily rolls from the central portion side of the PD 51 toward the FD 53 side can be formed, and backflow of electric charge can be prevented.

The pixel 50 has a structure in which when two adjacent transfer transistors 52 are simultaneously turned on, charges are transferred to the FD 53 through a gap region of the gates TG of the two transfer transistors 52 that are turned on, and is controlled to be sequentially turned on with phases shifted by half, so that switching of the states 101*a* to 101*d* in FIG. 8 is made clear, and sharp separation of charge transfer is enabled.

Figure 9:
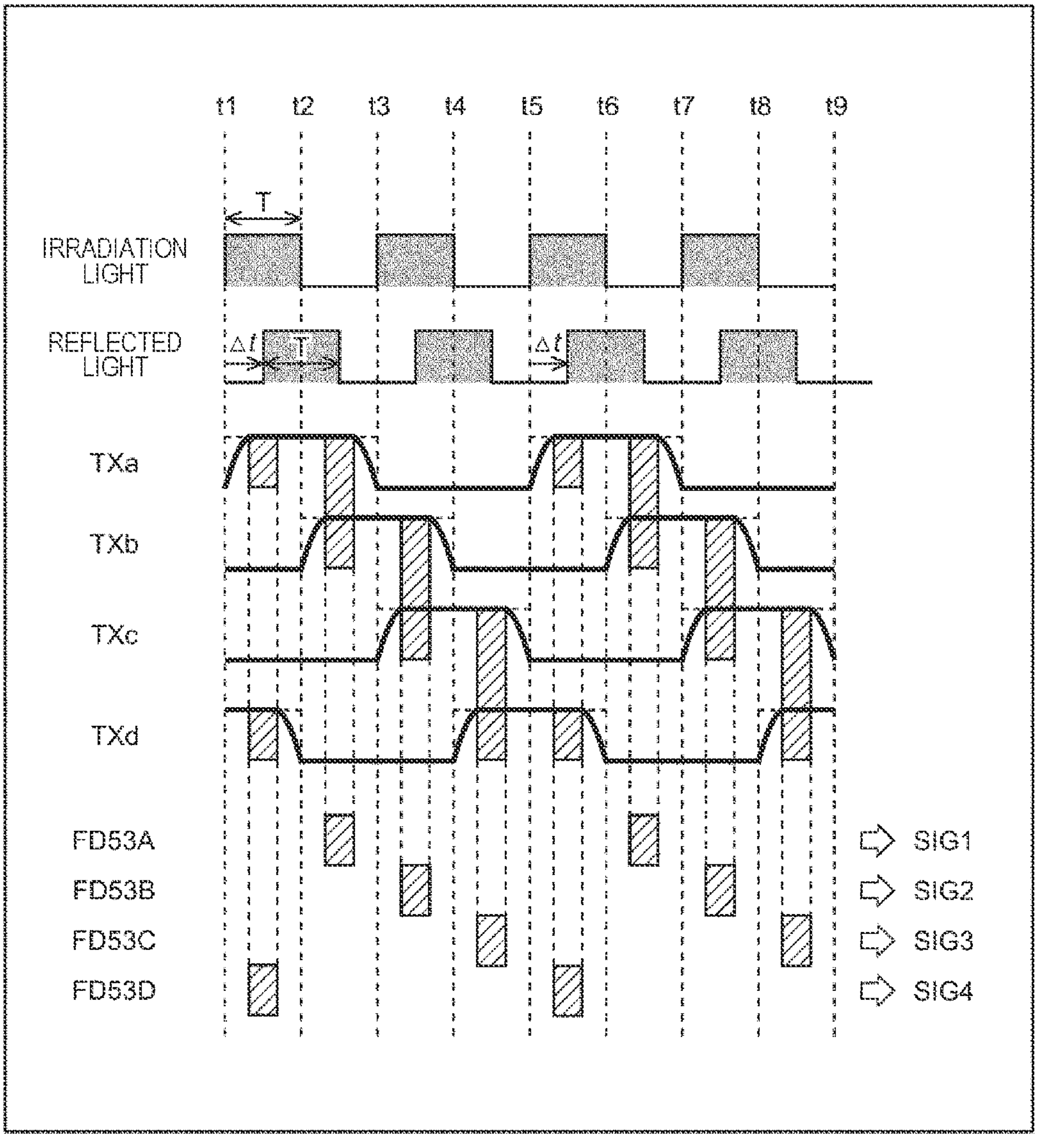
FIG. 9 is a diagram of assistance in explaining an effect of the pixel in FIG. 6.

The transfer control signal TX for driving the transfer transistor 52 is not an ideal rectangular wave as illustrated in FIG. 7, but actually, as illustrated in FIG. 9, for example, the transfer control signal TX becomes a so-called rounded signal in which the rise and fall are gently (obliquely) changed.

For example, in a case where the drive control of alternately turning on the two transfer transistors 52 and switching the FD 53 of the transfer destination is performed as in a 2-tap pixel structure, the oblique period of the transfer control signal TX varies for each pixel, and thus the characteristics may be different for each pixel.

On the other hand, in the pixel 50, as illustrated in FIG. 9, the two transfer transistors 52 are simultaneously turned on, and the charge is transferred only during the period in which the total value of the voltage levels of the two transfer control signals TX becomes equal to or more than the certain value, so that the influence of the oblique period (rounding period) can be alleviated, and the charge transfer in which the pixel variation is suppressed can be realized.

6. Modified Example of Pixel

Figure 10:
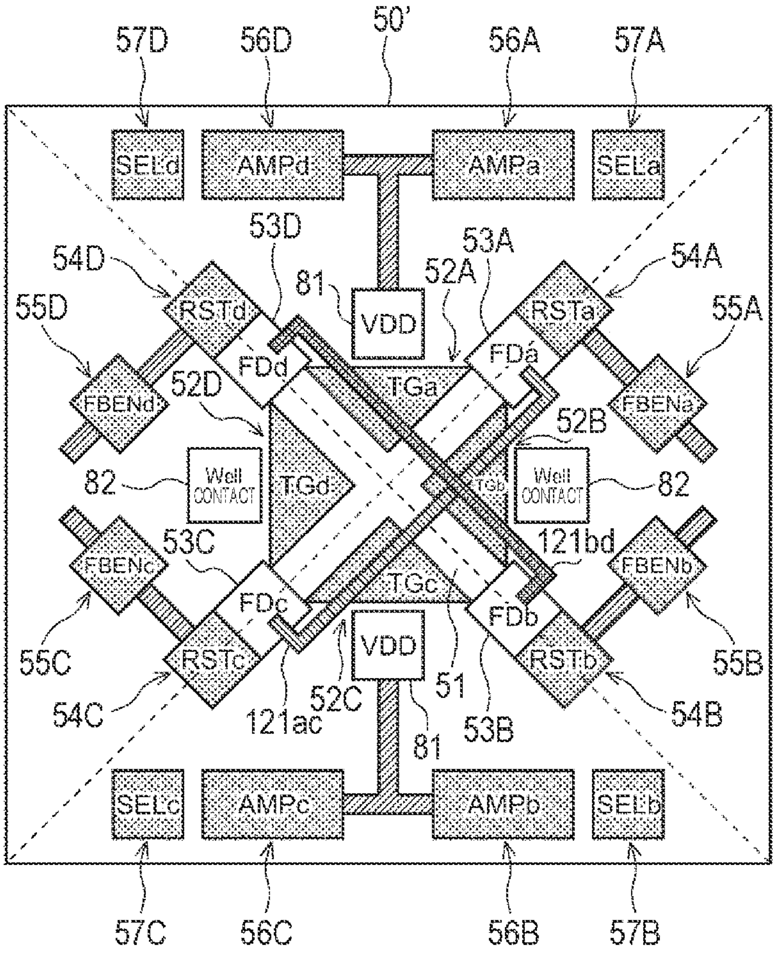
FIG. 10 is a plan view of a modified example of the pixel in FIG. 6.

FIG. 10 depicts a plan view of a pixel 50' that is a modified example of the pixel 50 illustrated in FIG. 6.

In FIG. 10, parts corresponding to those in FIG. 6 are denoted by the same reference numerals, and the description of the parts will be omitted as appropriate.

The pixel 50' in FIG. 10 is different from the pixel 50 in FIG. 6 in having a structure in which the two FDs 53 in the diagonal direction among the four FDs 53A to 53D are electrically connected and shared, and the other points are common to the pixel 50 in FIG. 6.

Specifically, in the pixel 50', the FD 53A (diffusion layer FDa) of the first tap 71A and the FD 53C (diffusion layer FDc) of the third tap 71C are connected by a connection line 121*ac*, and the FD 53B (diffusion layer FDb) of the second tap 71B and the FD 53D (diffusion layer FDd) of the fourth tap 71D are connected by a connection line 121*bd*.

Figure 11:
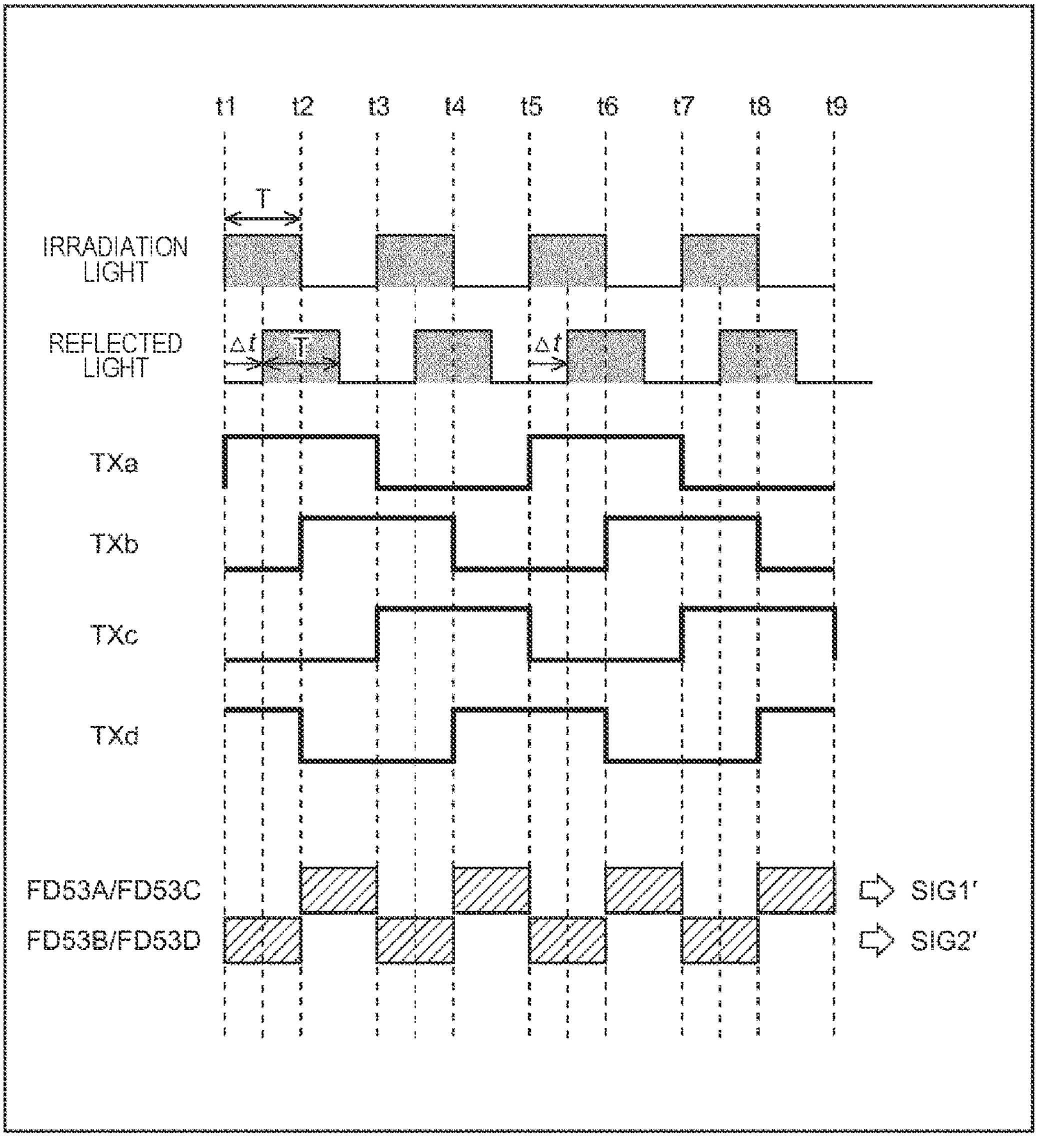
FIG. 11 is a timing chart depicting first drive control by the pixel in FIG. 10.

FIG. 11 is a timing chart depicting the first drive control in the pixel 50' illustrated in FIG. 10.

The driving of the pixel 50' is the same as the pixel 50 in FIG. 6. In the pixel 50 in FIG. 6, signals corresponding to the charge amounts accumulated in the FDs 53A to 53D of the first tap 71A to the fourth tap 71D are output to the column processing unit 43 as the detection signals SIG1 to SIG4, respectively.

In the pixel 50' in FIG. 11, the FD 53A of the first tap 71A and the FD 53C of the third tap 71C are shared, and the FD 53B of the second tap 71B and the FD 53D of the fourth tap 71D are shared. Therefore, as illustrated in FIG. 11, a signal corresponding to the charge amount accumulated in the FD 53A and the FD 53C is output to the column processing unit 43 as the detection signal SIG1', and a signal corresponding to the charge amount accumulated in the FD 53B and the FD 53D is output to the column processing unit 43 as the detection signal SIG2'.

According to the pixel 50' illustrated in FIG. 10, since the capacitance of the FD 53 per pixel is enlarged, reset noise generated in the reset transistor 54A can be reduced.

Note that the structure in which the two FDs 53 in the diagonal direction are shared may be realized in the pixel region of the pixel 50', or may be realized by the column processing unit 43, the signal processing unit 46, or the like at a stage subsequent to the pixel array unit 41.

In a case where the connection lines 121*ac* and 121*bd* are provided in the pixel region of the pixel 50', the reset transistor 54 and the feedback enable transistor 55 of one of the two shared taps 71 can be omitted. For example, the reset transistor 54C and the feedback enable transistor 55C of the third tap 71C, and the reset transistor 54D and the feedback enable transistor 55D of the fourth tap 71D can be omitted. As a result, the number of pixel transistors in the pixel can be reduced.

On the other hand, in a case where the connection lines 121*ac* and 121*bd* are provided at a stage subsequent to the pixel array unit 41, a connection switch for turning on and off connection is configured by a MOS transistor or the like in each of the connection lines 121*ac* and 121*bd*, and switching is performed as necessary, so that it is possible to selectively use a 4-tap independent drive similar to the pixel 50 in FIG. 6 and a 2-tap sharing drive in an operation mode or the like.

7. Second Drive Control Example of Pixel

Next, the second drive control executable in the pixel 50 in FIG. 6 will be described.

Figure 12:
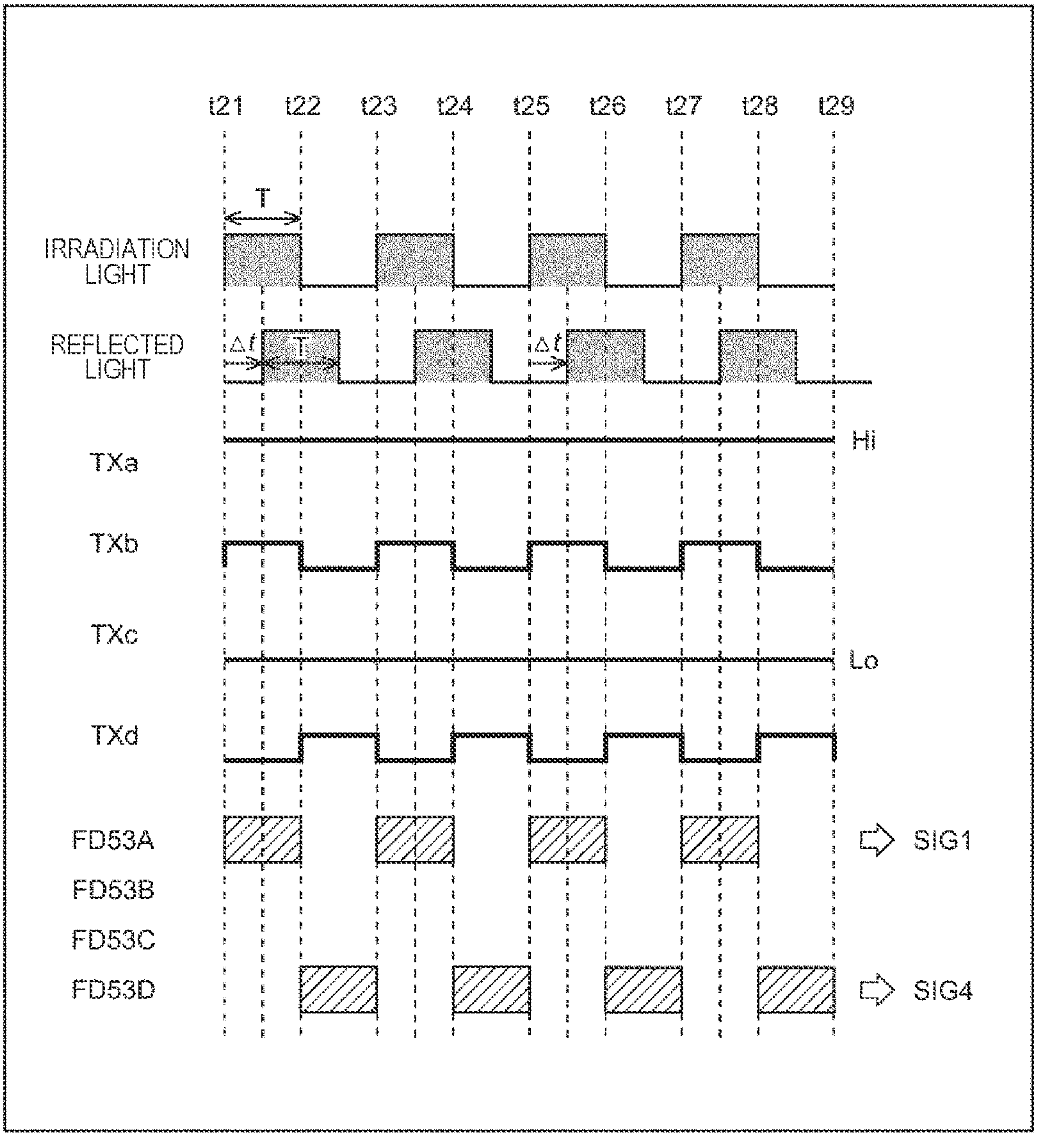
FIG. 12 is a timing chart depicting second drive control of the pixel in FIG. 6.

FIG. 12 is a timing chart depicting the second drive control during the charge accumulation period of the pixel 50.

In the second drive control, as illustrated in FIG. 12, during the charge accumulation period, the Hi-level transfer control signal TXa is constantly supplied from the vertical driving unit 42 to the gate TGa of the transfer transistor 52A of the first tap 71A, and the vertical driving unit 42 constantly controls the transfer transistor 52A to be on.

Furthermore, the transfer control signal TXc of Lo is constantly supplied from the vertical driving unit 42 to the gate TGc of the transfer transistor 52C of the third tap 71C, and the vertical driving unit 42 constantly controls the transfer transistor 52C to be off.

On the other hand, the vertical driving unit 42 alternately turns on and off the transfer transistor 52B of the second tap 71B and the transfer transistor 52D of the fourth tap 71D facing each other at every irradiation time T.

Specifically, during a period from time t21 to time t22, the vertical driving unit 42 supplies the Hi-level transfer control signal TXb to the gate TGb of the transfer transistor 52B of the second tap 71B, turns on the transfer transistor 52B of the second tap 71B, supplies the Lo-level transfer control signal TXd to the gate TGd of the transfer transistor 52D of the fourth tap 71D, and turns off the transfer transistor 52D of the fourth tap 71D.

During a period from the next time t22 to time t23, the vertical driving unit 42 supplies the Lo-level transfer control signal TXb to the gate TGb of the transfer transistor 52B of the second tap 71B, turns off the transfer transistor 52B of the second tap 71B, supplies the Hi-level transfer control signal TXd to the gate TGd of the transfer transistor 52D of the fourth tap 71D, and turns on the transfer transistor 52D of the fourth tap 71D.

During a period from the next time t23 to time t24, the vertical driving unit 42 supplies the Hi-level transfer control signal TXb to the gate TGb of the transfer transistor 52B of the second tap 71B, turns on the transfer transistor 52B of the second tap 71B, supplies the Lo-level transfer control signal TXd to the gate TGd of the transfer transistor 52D of the fourth tap 71D, and turns off the transfer transistor 52D of the fourth tap 71D.

During a period from the next time t24 to time t25, the vertical driving unit 42 supplies the Lo-level transfer control signal TXb to the gate TGb of the transfer transistor 52B of the second tap 71B, turns off the transfer transistor 52B of the second tap 71B, supplies the Hi-level transfer control signal TXd to the gate TGd of the transfer transistor 52D of the fourth tap 71D, and turns on the transfer transistor 52D of the fourth tap 71D.

Similar control is repeated also after time t25.

As a result, for example, the T period in which the transfer transistor 52B of the second tap 71B is turned on becomes the state 101*a* of FIG. 8, and the charge generated in the PD 51 is transferred to the FD 53A (diffusion layer FDa) of the first tap 71A through the gap region between the gate TGa of the transfer transistor 52A and the gate TGb of the transfer transistor 52B.

On the other hand, the T period in which the transfer transistor 52D of the fourth tap 71D is turned on becomes the state 101*d* of FIG. 8, and the charge generated in the PD 51 is transferred to the FD 53D (diffusion layer FDd) of the fourth tap 71D through the gap region between the gate TGd of the transfer transistor 52D and the gate TGa of the transfer transistor 52A.

Then, as illustrated in the lower part of FIG. 12, the charge accumulated in the FD 53A of the first tap 71A is output to the column processing unit 43 as a detection signal SIG1, and the charge accumulated in the FD 53D of the fourth tap 71D is output to the column processing unit 43 as a detection signal SIG4.

Since the charge accumulation period of the FD 53A has the same phase as the irradiation light and the charge accumulation period of the FD 53D has the inverted phase with the irradiation light, the distance to the object can be obtained on the basis of the ratio between the detection signal SIG1 and the detection signal SIG4. The FD 53B of the second tap 71B and the FD 53C of the third tap 71C are not used in the second drive control.

Note that in the signal reading period, the transfer transistor 52A of the first tap 71A and the transfer transistor 52C of the third tap 71C are turned on. As a result, all of the switches SW_A to SW_D are in a state of being connected to the terminal Z, and surplus charges generated in the PD 51 in the period other than the charge accumulation period are discharged to the two VDD contacts 81 in FIG. 6. (The voltage of) $Hi_{VDD}$-level of the transfer control signal TXa turning on the transfer transistor 52A in the signal reading period is set to be equal to or larger than (the voltage of) $Hi_{FD}$-level of the transfer control signal TXa turning on the transfer transistor 52A in the charge accumulation period ($Hi_{VDD}$-level$\geq$$Hi_{FD}$-level).

<Effects of Second Drive Control>

In the second drive control, the ON period of the transfer transistor 52B of the second tap 71B and the transfer transistor 52D of the fourth tap 71D is the same as one charge accumulation period and irradiation time T of each FD 53, and is ½ of the first drive control. However, (the voltages of) the Hi-levels of the transfer control signals TXb and TXd supplied to the transfer transistor 52B of the second tap 71B and the transfer transistor 52D of the fourth tap 71D to be turned on and off can be made lower than those in the first drive control by constantly controlling the transfer transistor 52A of the first tap 71A to be on. Since the low-voltage driving is enabled, the drive frequency at the time of alternately turning on and off can be increased. As a result, according to the second drive control, driving can be sufficiently performed even at a drive frequency twice that of the first drive control.

Furthermore, in the second drive control described above, the transfer control signal TXc to the transfer transistor 52C of the third tap 71C to be controlled to be off is constantly set to Lo level (GND), but may be set to a negative bias. As a result, a charge transfer gradient can be applied from the FD 53B side and the FD 53C side to the FD 53A side and the FD 53D side, and charge transfer can be more easily performed.

The second drive control can be realized even when the transfer transistor 52 that is constantly controlled to be on and off is reversed. Specifically, the vertical driving unit 42 controls the transfer transistor 52A of the first tap 71A to be constantly off and controls the transfer transistor 52C of the third tap 71C to be constantly on during the charge accumulation period. In addition, the vertical driving unit 42 alternately turns on and off the transfer transistor 52B of the second tap 71B and the transfer transistor 52D of the fourth tap 71D at every irradiation time T. In this case, in the T period in which the transfer transistor 52B of the second tap 71B is turned on, charges are accumulated in the FD 53B of the second tap 71B, and the detection signal SIG2 corresponding to the accumulated charge amount is output to the column processing unit 43. In addition, during the T period in which the transfer transistor 52C of the third tap 71C is turned on, charges are accumulated in the FD 53C of the third tap 71C, and the detection signal SIG3 corresponding to the accumulated charge amount is output to the column processing unit 43. The FD 53A of the first tap 71A and the FD 53D of the fourth tap 71D are not used.

8. Third Drive Control Example of Pixel

Next, a third drive control executable in the pixel 50 in FIG. 6 will be described.

Figure 13:
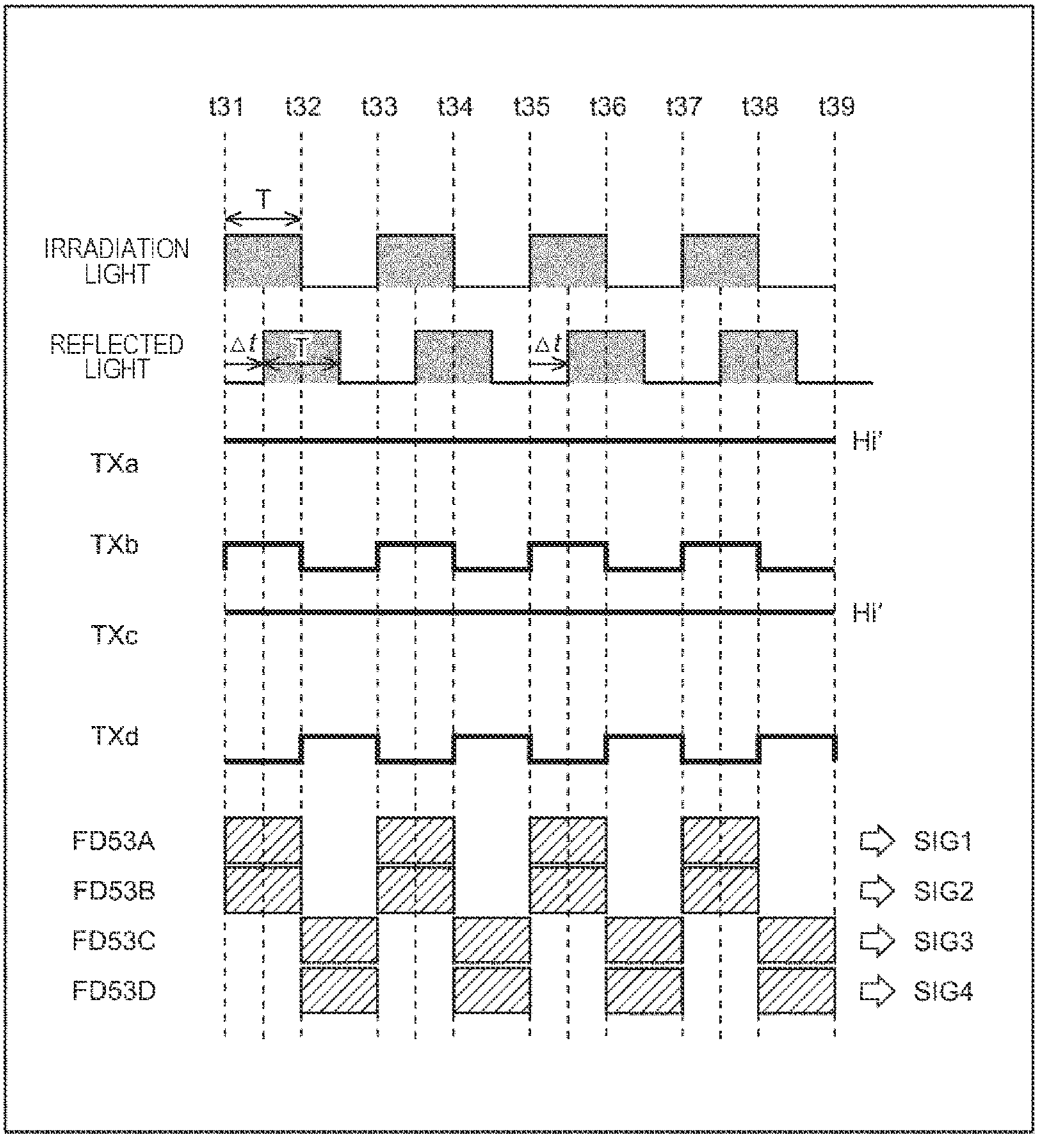
FIG. 13 is a timing chart depicting third drive control of the pixel in FIG. 6.

FIG. 13 is a timing chart depicting the third drive control during the charge accumulation period of the pixel 50.

In the third drive control, voltages applied to the transfer transistor 52A of the first tap 71A and the transfer transistor 52C of the third tap 71C during the charge accumulation period are different from those in the second drive control, and other drives are similar to those in the second drive control.

Specifically, as illustrated in FIG. 13, during the charge accumulation period, the transfer control signal TXa of Hi' is constantly supplied from the vertical driving unit 42 to the gate TGa of the transfer transistor 52A of the first tap 71A, the transfer transistor 52A is constantly controlled to be on, the transfer control signal TXc of Hi' is constantly supplied to the gate TGc of the transfer transistor 52C of the third tap 71C, and the transfer transistor 52C is also constantly controlled to be on.

Here, the applied voltages of Hi' levels of the transfer control signals TXa and TXc supplied to the transfer transistors 52A and 52C are voltages adjusted to be lower than the Hi level applied to the gate TGa of the transfer transistor 52A in the second drive control or the Hi level turned on when the unnecessary charges generated in the PD 51 are discharged to the two VDD contacts 81. For example, the voltages are set to about 70 to 80% when the unnecessary charges are discharged to the two VDD contacts 81. As a result, by making the potential when the transfer transistors 52A and 52C are turned on higher than the potential when the transfer transistor 52B or 52D is turned on, the charge generated in the PD 51 during the charge accumulation period is prevented from being discharged to the VDD contact 81.

Similarly to the second drive control, the vertical driving unit 42 alternately turns on and off the transfer transistor 52B of the second tap 71B and the transfer transistor 52D of the fourth tap 71D at every irradiation time T.

Figure 14:
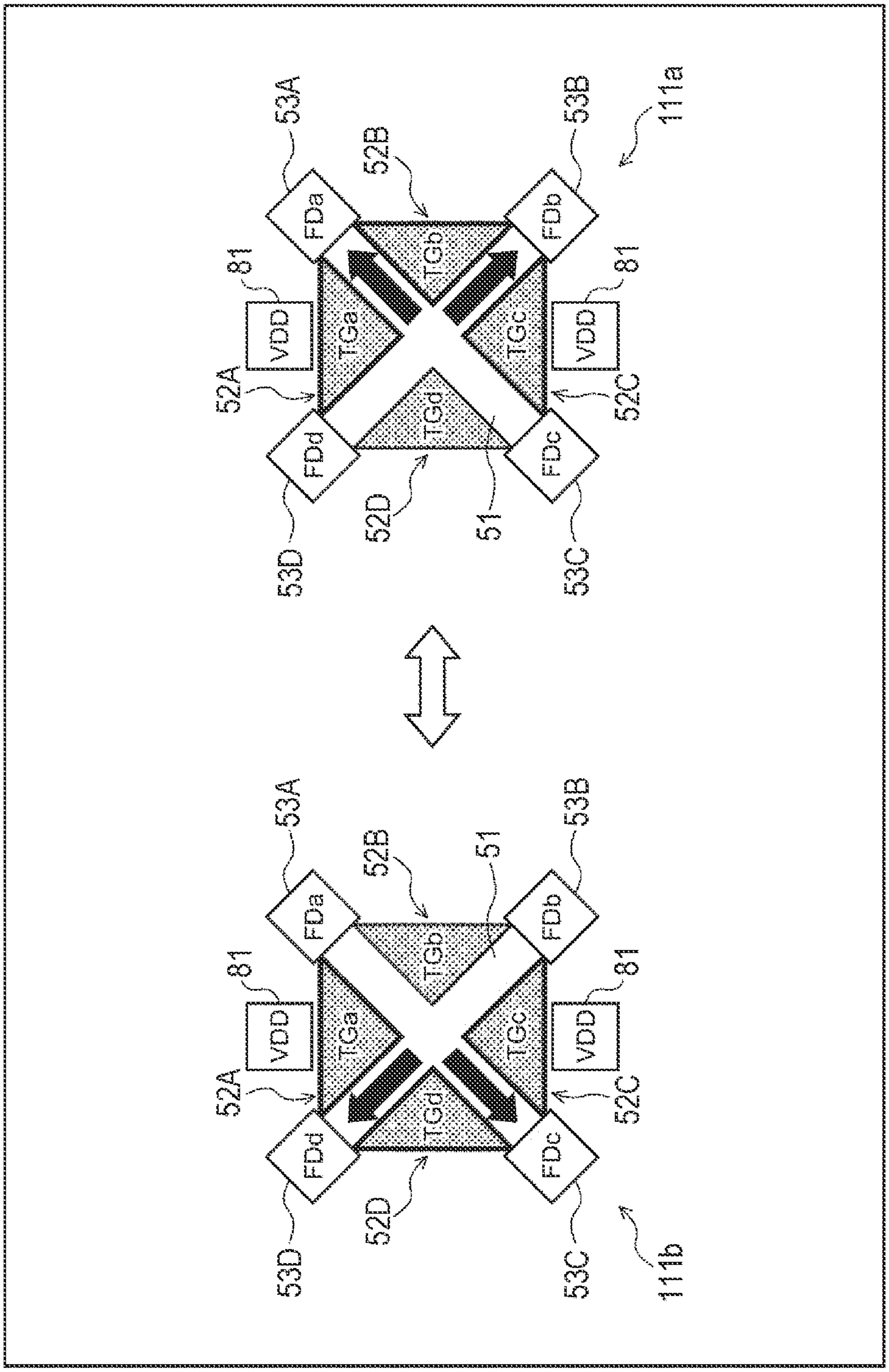
FIG. 14 is a plan view of a part of a pixel for explaining an operation state.

As a result, an operation in which the charges generated in the PD 51 are transferred to the FD 53A (diffusion layer FDa) of the first tap 71A and the FD 53B (diffusion layer FDb) of the second tap 71B as in a state 111*a* illustrated on the right side of FIG. 14 and an operation in which the charges are transferred to the FD 53C (diffusion layer FDc) of the third tap 71C and the FD 53D (diffusion layer FDd) of the fourth tap 71D as in a state 111*b* illustrated on the left side of FIG. 14 are alternately executed. The state 111*a* is a state in which the three transfer transistors 52A to 52C of the first tap 71A, the second tap 71B, and the third tap 71C are simultaneously turned on, and the state 111*b* is a state in which the three transfer transistors 52B to 52D of the second tap 71B, the third tap 71C, and the fourth tap 71D are simultaneously turned on.

Then, as illustrated in the lower part of FIG. 13, in the signal reading period, signals corresponding to the charge amounts accumulated in the FDs 53A to 53D of the first tap 71A to the fourth tap 71D are output to the column processing unit 43 as detection signals SIG1 to SIG4, respectively.

The charge accumulation periods of the FD 53A and the FD 53B have the same phase as that of the irradiation light, and the charge accumulation periods of the FD 53C and the FD 53D have an inverted phase with that of the irradiation light. Therefore, the distance to the object can be obtained on the basis of the ratio between the detection signal (SIG1+SIG2) and the detection signal (SIG3+SIG4). Note that the distance can be obtained only by the ratio between the detection signals SIG1 and SIG4 or the ratio between the detection signals SIG2 and SIG3.

<Effect of Third Drive Control>

According to the third drive control, (the voltages of) the Hi-levels of the transfer control signals TXb and TXd supplied to the transfer transistor 52B of the second tap 71B and the transfer transistor 52D of the fourth tap 71D to be turned on and off can be made lower than those in the first drive control by constantly controlling the transfer transistors 52A and 52C to be on. Since the low-voltage driving is enabled, the drive frequency at the time of alternately turning on and off can be increased. As a result, according to the third drive control, driving can be sufficiently performed even at a drive frequency twice that of the first drive control.

Furthermore, according to the third drive control, when the transfer transistor 52B is turned on, charges are accumulated in the FD 53A and the FD 53B, and when the transfer transistor 52D is turned on, charges are accumulated in the FD 53C (diffusion layer FDc) and the FD 53D, so that it is possible to accumulate a charge amount twice that in the second drive control. Therefore, the dynamic range can be expanded as compared with the second drive control.

9. Modified Example of Gate of Transfer Transistor

Figure 15:
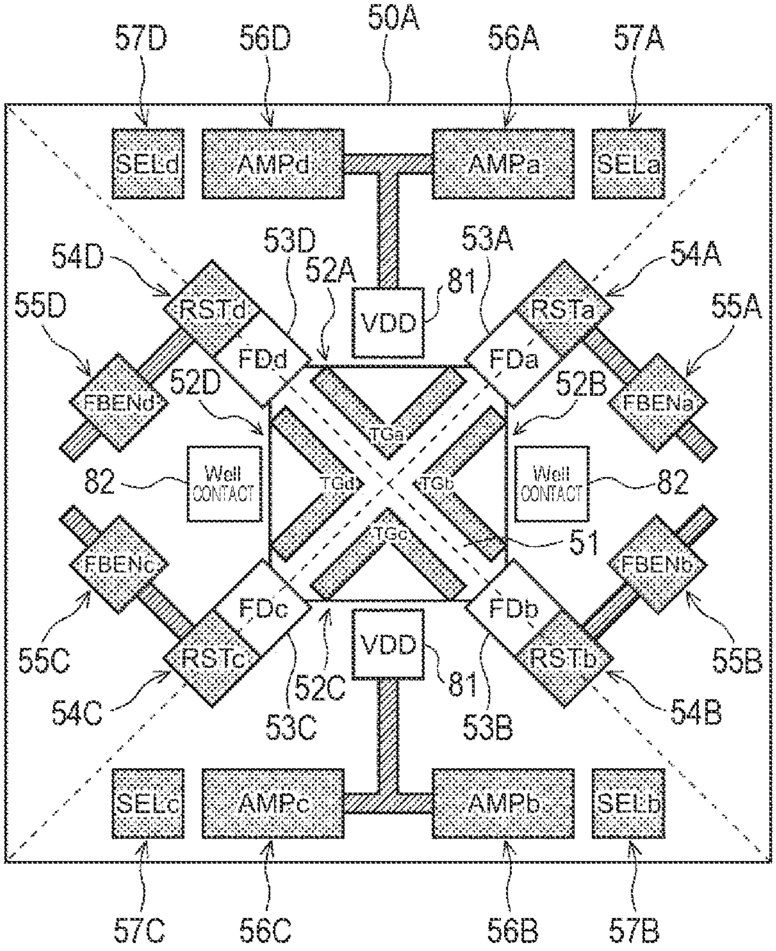
FIG. 15 is a plan view depicting a first modified example of a gate of a transfer transistor in the pixel in FIG. 4.
Figure 16:
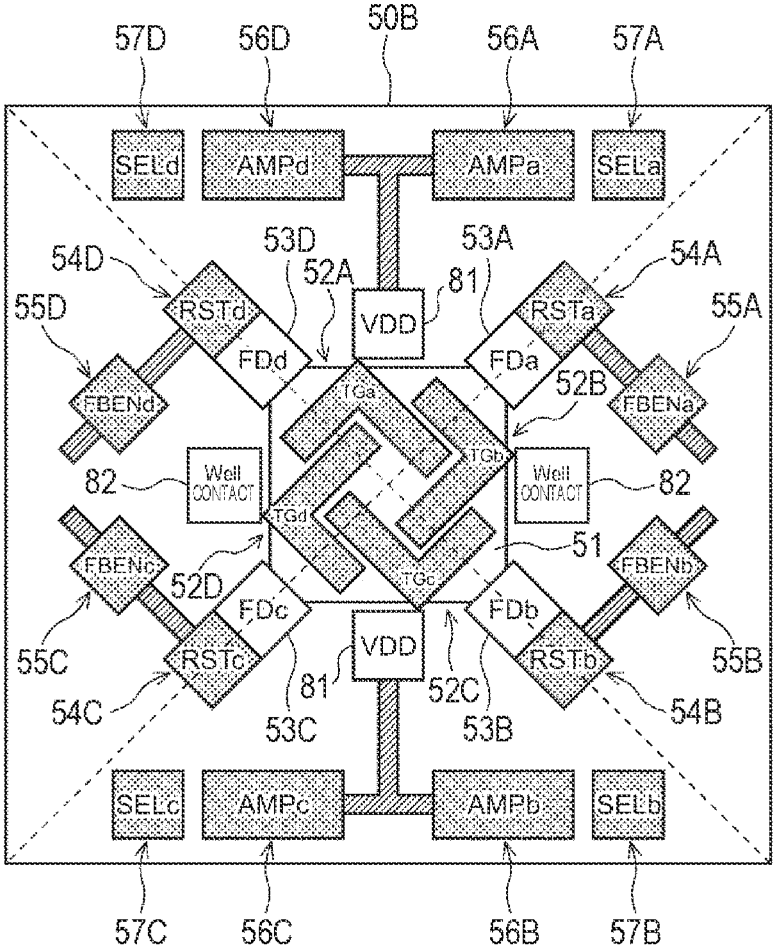
FIG. 16 is a plan view depicting a second modified example of the gate of the transfer transistor in the pixel in FIG. 4.

FIGS. 15 and 16 illustrate a modified example of the gate TG of the transfer transistor 52 in the pixel 50 described above.

In FIGS. 15 and 16, since the pixel 50 illustrated in FIG. 6 is similar to the pixel except for the gate TG of the transfer transistor 52, the description of the transfer transistor 52 other than the gate TG is omitted.

FIG. 15 is a plan view of a pixel 50A depicting a first modified example of the gate TG of the transfer transistor 52.

In the pixel 50 in FIG. 6, the planar shape of the gate TG of the transfer transistor 52 is formed in the substantially right-angled isosceles triangle shape as described above, but in the pixel 50A in FIG. 15, two linear shapes are formed in an L shape connected at one end portion at an orthogonal angle, and the L-shaped right-angled portion is arranged on the central portion side of the rectangular PD 51.

The L-shaped gates TGa to TGd are arranged to be separated from each other with diagonal regions having a predetermined width with each of two diagonal lines connecting diagonals of four corners of the rectangular PD 51 as center lines as gap regions of the adjacent transfer transistors 52.

As for the drive control, any of the first to third drive controls described above can be applied to the pixel 50A. For example, in the case of the first drive control described above, when the transfer transistor 52A and the transfer transistor 52B are simultaneously turned on, the charge generated in the PD 51 is transferred to the FD 53A (diffusion layer FDa) of the first tap 71A through the gap region between the gate TGa of the transfer transistor 52A and the gate TGb of the transfer transistor 52B.

Furthermore, for example, when the transfer transistor 52B and the transfer transistor 52C are simultaneously turned on, the charge generated in the PD 51 is transferred to the FD 53B (diffusion layer FDb) of the second tap 71B through the gap region between the gate TGb of the transfer transistor 52B and the gate TGc of the transfer transistor 52C.

In the pixel 50A of FIG. 15, since the formation area of the gate TG is smaller than that of the pixel 50 of FIG. 6, the gate capacitance can be reduced.

FIG. 16 is a plan view of a pixel 50B depicting a second modified example of the gate TG of the transfer transistor 52.

Also in the pixel 50B in FIG. 16, similarly to the pixel 50A in FIG. 15, the planar shape of the gate TG of the transfer transistor 52 is formed in an L shape. However, the direction of the L-shaped arrangement of the gate TG of the transfer transistor 52 in FIG. 16 is different from that of the gate TG of the transfer transistor 52 of the pixel 50A illustrated in FIG. 15. Specifically, in the pixel 50A in FIG. 15, the L-shaped right angle portion is arranged on the central portion side of the rectangular PD 51, but in the pixel B in FIG. 16, the L-shaped right-angled portion is arranged on the outer peripheral portion side of the rectangular PD 51.

Furthermore, the gates TG of the four transfer transistors 52 of the pixel 50 in FIG. 6 and the pixel 50A in FIG. 15 are arranged line-symmetrically and point-symmetrically, but the gates TG of the four transfer transistors 52 of the pixel 50B in FIG. 16 are point-symmetric but not line-symmetric.

Furthermore, in the pixel 50 in FIG. 6 and the pixel 50A in FIG. 15, the gap region between the gates TG of the two transfer transistors 52 that are simultaneously turned on serves as a charge transfer path, whereas in the pixel 50B in FIG. 16, the region under the gates TG of the two transfer transistors 52 that are simultaneously turned on serves as a charge transfer path.

Other Modified Examples

In the above-described example, the gate TG of the transfer transistor 52 has been described as a planar transistor formed in a flat plate shape on the upper surface of the semiconductor substrate, but may be formed of a vertical transistor having an embedded gate electrode structure formed by embedding the gate TG in the depth direction of the semiconductor substrate. The planar shape of the gate TG in the case of being formed of a vertical transistor is similar to that of the above-described example.

10. Configuration Example of Electronic Apparatus

The above-described distance measuring device 1 can be mounted on an electronic apparatus such as a smartphone, a tablet terminal, a mobile phone, a personal computer, a game machine, a television receiver, a wearable terminal, a digital still camera, or a digital video camera, for example.

Figure 17:
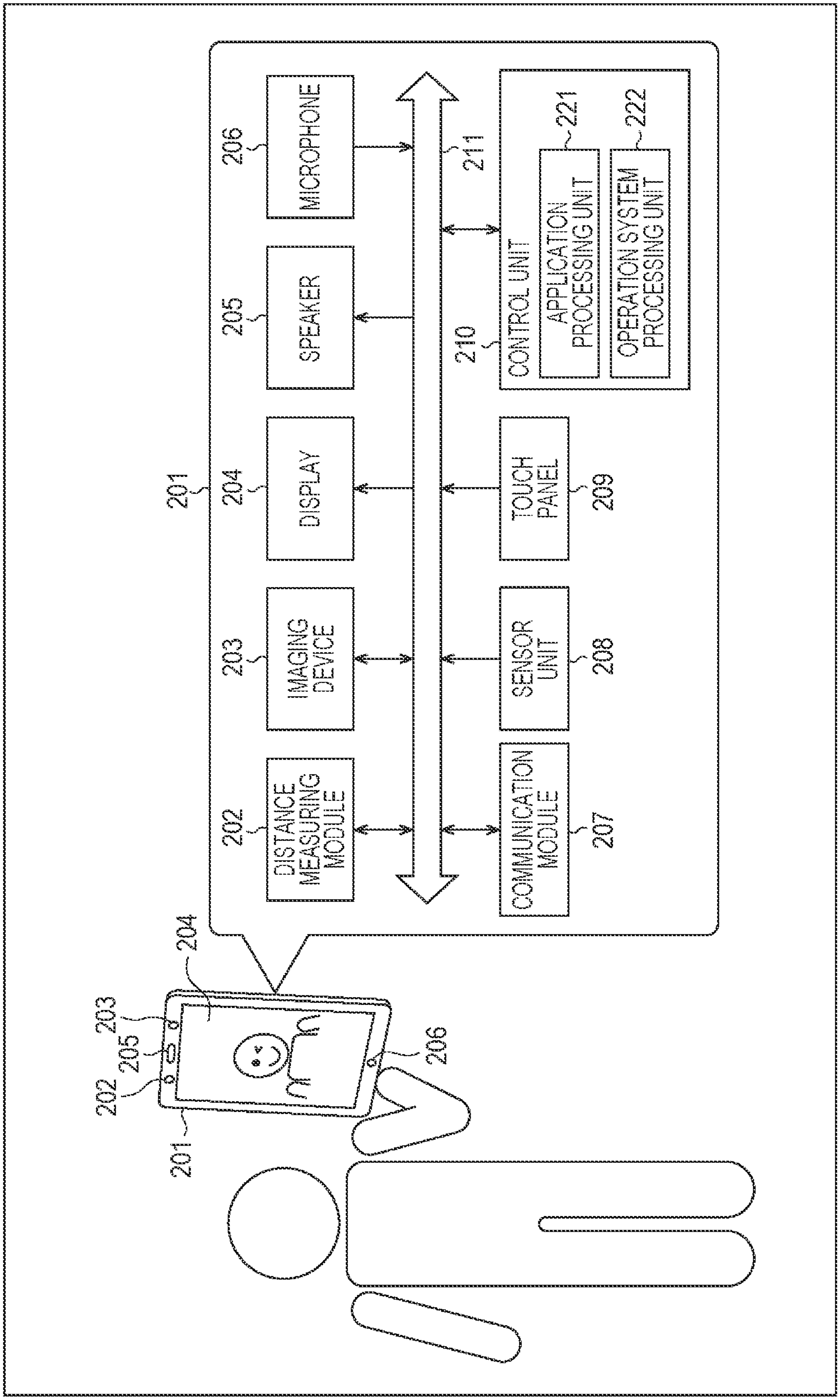
FIG. 17 is a block diagram depicting an example of configuration of an electronic apparatus to which the present technology is applied.

FIG. 17 is a block diagram depicting a configuration example of a smartphone as an electronic apparatus equipped with a distance measuring device.

As illustrated in FIG. 17, a smartphone 201 is configured by connecting a distance measuring module 202, an imaging device 203, a display 204, a speaker 205, a microphone 206, a communication module 207, a sensor unit 208, a touch panel 209, and a control unit 210 via a bus 211. In addition, the control unit 210 has functions as an application processing unit 221 and an operation system processing unit 222 by the CPU executing a program.

The distance measuring device 1 of FIG. 1 is applied to the distance measuring module 202. For example, the distance measuring module 202 is arranged in front of the smartphone 201, and performs distance measurement for the user of the smartphone 201, so that the depth value of the surface shape of the face, hand, finger, or the like of the user can be output as the distance measurement result.

The imaging device 203 is arranged in front of the smartphone 201, and performs imaging with the user of the smartphone 201 as a subject to acquire an image in which the user is imaged. Note that, although not illustrated, the imaging device 203 may also be arranged on the back surface of the smartphone 201.

The display 204 displays an operation screen for performing processing by the application processing unit 221 and the operation system processing unit 222, an image imaged by the imaging device 203, and the like. The speaker 205 and the microphone 206 output the voice of the other party and collect the voice of the user, for example, when making a call using the smartphone 201.

The communication module 207 performs communication via a communication network. The sensor unit 208 senses speed, acceleration, proximity, and the like, and the touch panel 209 acquires a touch operation by the user on an operation screen displayed on the display 204.

The application processing unit 221 performs processing for providing various services by the smartphone 201. For example, the application processing unit 221 can perform processing of creating a face by computer graphics virtually reproducing the expression of the user on the basis of the depth supplied from the distance measuring module 202 and displaying the face on the display 204. Furthermore, the application processing unit 221 can perform processing of creating three-dimensional shape data of an arbitrary three-dimensional object on the basis of the depth supplied from the distance measuring module 202, for example.

The operation system processing unit 222 performs processing for realizing basic functions and operations of the smartphone 201. For example, the operation system processing unit 222 can perform processing of authenticating the user's face and unlocking the smartphone 201 on the basis of the depth value supplied from the distance measuring module 202. Furthermore, on the basis of the depth value supplied from the distance measuring module 202, the operation system processing unit 222 can perform, for example, processing of recognizing a gesture of the user and processing of inputting various operations in accordance with the gesture.

In the smartphone 201 configured as described above, by applying the above-described distance measuring device 1, for example, it is possible to generate and output distance measurement information with improved distance measurement accuracy.

11. Application Example to Mobile Body

The technology according to the present disclosure (present technology) can be applied to various products. For example, the technology according to the present disclosure may be realized as a device mounted on any type of mobile body such as an automobile, an electric vehicle, a hybrid electric vehicle, a motorcycle, a bicycle, a personal mobility, an airplane, a drone, a ship, and a robot.

Figure 18:
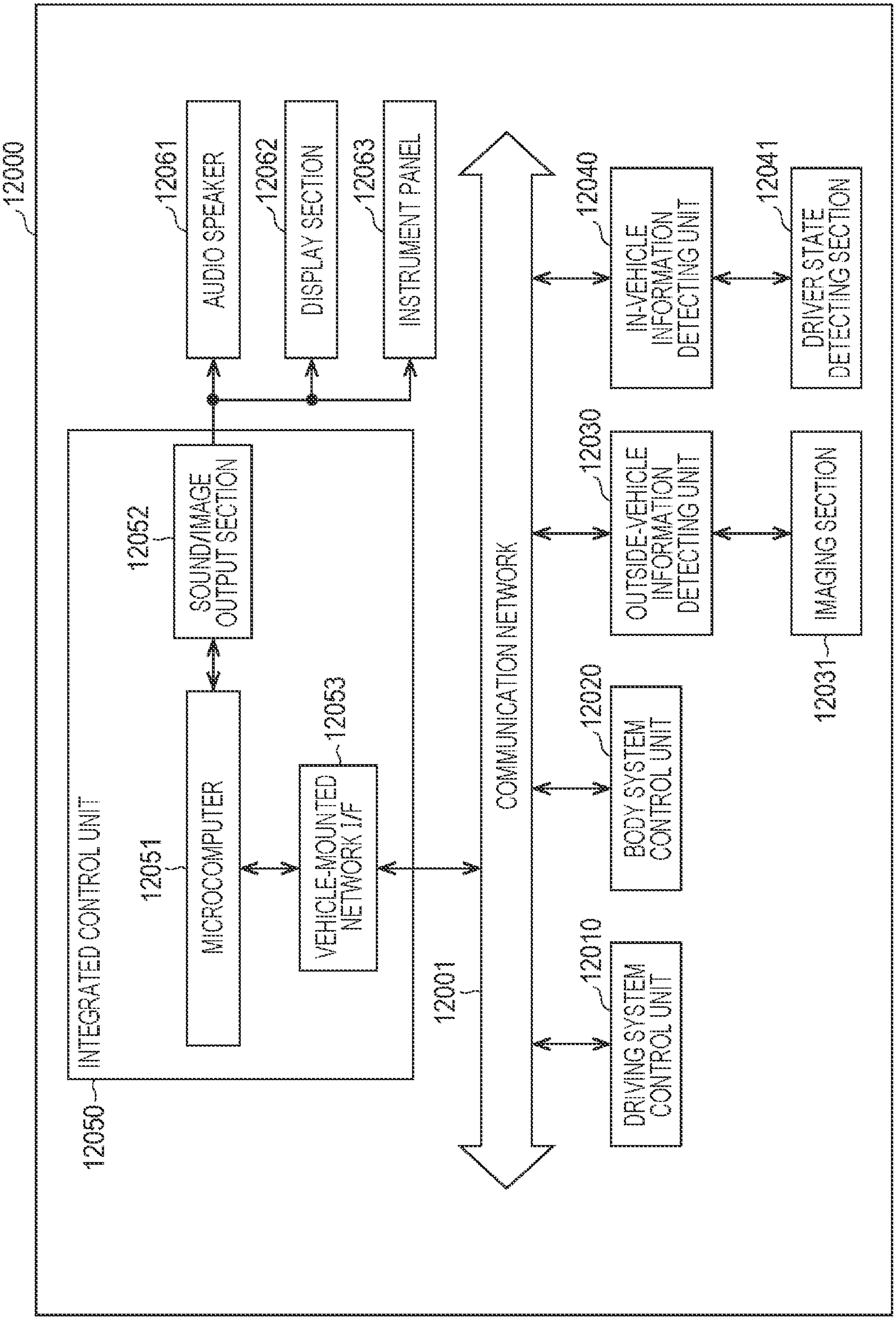
FIG. 18 is a block diagram depicting an example of schematic configuration of a vehicle control system.

FIG. 18 is a block diagram depicting a schematic configuration example of a vehicle control system which is an example of a mobile body control system to which the technology according to the present disclosure can be applied.

The vehicle control system 12000 includes a plurality of electronic control units connected to each other via a communication network 12001. In the example illustrated in FIG. 18, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of outside-vehicle information obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 18, an audio speaker 12061, a display section 12062, and an instrument panel 12063 are illustrated as the output device. The display section 12062 may, for example, include at least one of an on-board display and a head-up display.

Figure 19:
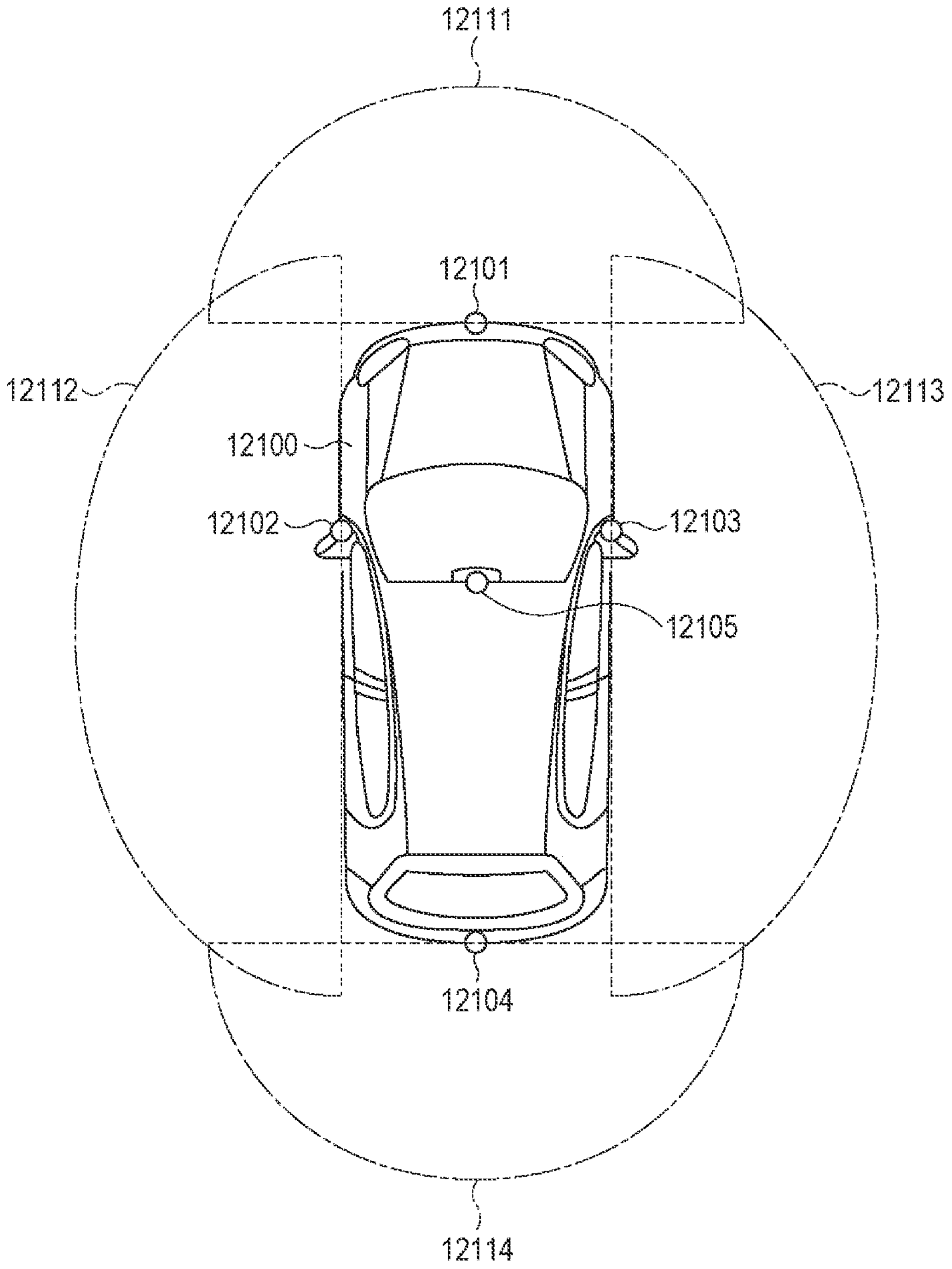
FIG. 19 is a diagram of assistance in explaining an example of installation positions of an outside-vehicle information detecting section and an imaging section.

FIG. 19 is a diagram illustrating an example of an installation position of the imaging section 12031.

In FIG. 19, the vehicle 12100 includes imaging sections 12101, 12102, 12103, 12104, and 12105 as the imaging section 12031.

The imaging sections 12101, 12102, 12103, 12104, and 12105 are, for example, arranged at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The front images obtained by the imaging sections 12101 and 12105 are mainly used for detecting a preceding vehicle, a pedestrian, an obstacle, a traffic light, a traffic sign, a lane, or the like.

Note that, FIG. 19 illustrates an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to the outside-vehicle information detecting unit 12030 and the in-vehicle information detecting unit 12040 among the above-described configurations. Specifically, by using distance measurement by the distance measuring device 1 as the outside-vehicle information detecting unit 12030 and the in-vehicle information detecting unit 12040, it is possible to perform processing of recognizing a gesture of the driver, execute operations of various systems (for example, an audio system, a navigation system, and an air conditioning system) in accordance with the gesture, and more accurately detect the state of the driver. In addition, the unevenness of the road surface can be recognized using the distance measurement by the distance measuring device 1 and reflected in the control of the suspension.

The embodiments of the present technology are not limited to the above-described embodiments, and various modifications can be made without departing from the gist of the present technology.

A plurality of the present technologies described in the present specification can be implemented independently as a single body as long as there is no contradiction. Of course, a plurality of arbitrary present technologies can be implemented in combination. For example, some or all of the present technology described in any of the embodiments can be implemented in combination with some or all of the present technology described in other embodiments. Furthermore, some or all of the above-described arbitrary present technology can be implemented in combination with other technologies not described above.

Furthermore, for example, a configuration described as one device (or processing unit) may be divided and configured as a plurality of devices (or processing units). Conversely, the configurations described above as a plurality of devices (or processing units) may be collectively configured as one device (or processing unit). Furthermore, of course, a configuration other than the above-described configuration may be added to the configuration of each device (or each processing unit). Furthermore, as long as the configuration and operation of the entire system are substantially the same, a part of the configuration of a certain device (or processing unit) may be included in the configuration of another device (or another processing unit).

Note that the effects described in the present specification are merely examples and are not limited, and effects other than those described in the present specification may be provided.

Note that, the present technology can also adopt the following configurations.

(1) A light receiving device including a pixel that transfers a charge generated in a photoelectric conversion unit to a predetermined FD in a case where a voltage of a predetermined value or more is simultaneously applied to gates of at least two transfer transistors.

(2) The light receiving device according to (1), in which an ON period of the transfer transistor, which is a period during which a voltage of a predetermined value or more is applied to the gate, is shifted by half between the two transfer transistors.

(3) The light receiving device according to (2), in which an ON period of the transfer transistor is twice an irradiation time of reflected light received by the photoelectric conversion unit.

(4) The light receiving device according to any one of (1) to (3), in which the pixel includes the four transfer transistors, and is configured such that a voltage of a predetermined value or more is simultaneously applied to gates of two adjacent transfer transistors.

(5) The light receiving device according to (4), in which the light receiving device is configured such that the charge is transferred to the predetermined FD through a gap region between the gates of the two adjacent transfer transistors to which a voltage of a predetermined value or more is simultaneously applied.

(6) The light receiving device according to (4) or (5), in which a planar shape of the gate of the transfer transistor is a substantially right-angled triangular shape, and a right-angled portion of the substantially right-angled triangular shape is arranged on a center portion side of the photoelectric conversion unit.

(7) The light receiving device according to any one of (4) to (6), in which the pixel includes the four FDs, and the four FDs are arranged at corner portions of four corners of the photoelectric conversion unit having a rectangular shape.

(8) The light receiving device according to any one of (4) to (7), in which the four transfer transistors are configured such that voltages of a predetermined value or more are sequentially applied to gates thereof.

(9) The light receiving device according to (7), in which two FDs in a diagonal direction among the four FDs are electrically connected to each other.

(10) The light receiving device according to any one of (1) to (9), in which the light receiving device is configured such that the charge is transferred to the predetermined FD in a period in which a total value of voltages applied to gates of the two transfer transistors becomes a predetermined value or more.

(11) The light receiving device according to (1) or (10), in which the pixel includes the four transfer transistors, is controlled to a state in which a voltage of a predetermined value or more is constantly applied to a gate of a first transfer transistor that is one of the four transfer transistors, and is configured such that a voltage of a predetermined value or more is applied to a transfer transistor adjacent to the first transfer transistor, so that a voltage of a predetermined value or more is simultaneously applied to gates of two transfer transistors.

(12) The light receiving device according to (11), in which the light receiving device further includes a second transfer transistor and a third transfer transistor facing each other as transfer transistors adjacent to the first transfer transistor, and is configured such that a voltage of a predetermined value or more is alternately applied to gates of the second and third transfer transistors.

(13) The light receiving device according to (11) or (12), in which an ON period that is a period during which a voltage of a predetermined value or more is applied to a gate of a transfer transistor adjacent to the first transfer transistor is the same time as an irradiation time of reflected light received by the photoelectric conversion unit.

(14) The light receiving device according to any one of (11) to (13), in which a fourth transfer transistor facing the first transfer transistor is configured to be controlled constantly to an inactive state.

(15) The light receiving device according to (14), in which the light receiving device is configured such that a negative bias is constantly applied to a gate of the fourth transfer transistor.

(16) The light receiving device according to (1) or (10), in which the pixel includes the four transfer transistors, is controlled to a state in which a voltage of a predetermined value or more is constantly applied to gates of first and second transfer transistors which are two transfer transistors facing each other among the four transfer transistors, and is configured such that a voltage of a predetermined value or more is alternately applied to gates of third and fourth transfer transistors, which are the other two transfer transistors facing each other, so that a voltage of a predetermined value or more is simultaneously applied to gates of three transfer transistors.

(17) The light receiving device according to any one of (1) to (16), in which the light receiving device is configured such that a planar shape of a gate of the transfer transistor is an L shape, and the charge is transferred to the predetermined FD through a gap region between gates of the two transfer transistors to which a voltage of a predetermined value or more is simultaneously applied.

(18) The light receiving device according to any one of (1) to (16), in which the light receiving device is configured such that a planar shape of a gate of the transfer transistor is an L shape, and the charge is transferred to the predetermined FD through a region under gates of the two transfer transistors to which a voltage of a predetermined value or more is simultaneously applied.

(19) The light receiving device according to any one of (1) to (18), in which the transfer transistor includes a vertical transistor.

(20) A drive control method for a light receiving device, the drive control method including transferring, by the light receiving device including a pixel including at least two transfer transistors, a charge generated in a photoelectric conversion unit to a predetermined FD in a case where a voltage of a predetermined value or more is simultaneously applied to gates of the at least two transfer transistors of the pixel.

(21) A distance measuring device including:

a predetermined light source; and a light receiving device that receives reflected light returned after irradiation light emitted from the predetermined light source is reflected by an object, in which the light receiving device includes a pixel that transfers a charge generated in a photoelectric conversion unit to a predetermined FD in a case where a voltage of a predetermined value or more is simultaneously applied to gates of at least two transfer transistors.

REFERENCE SIGNS LIST

1 Distance measuring device

12 Light receiving unit (Light receiving device)

13 Signal processing unit
14 Light emitting unit (Light emitting source)
15 Light emission control unit
41 Pixel array unit
50, 50', 50A, 50B Pixel
51 PD
SW_A to SW_D Switch
52 (52A to 52D) Transfer transistor
TG Gate
TX Transfer control signal
53 (53A to 53D) FD
54 (54A to 54D) Reset transistor
55 (55A to 55D) Feedback enable transistor
56 (56A to 56D) Amplification transistor
57 (57A to 57D) Selection transistor
58 (58A to 58D) Constant current source
59 (59A to 59D) Feedback amplifier
71A First tap
71B Second tap
71C Third tap
71D Fourth tap
81 VDD contact
82 Well contact
121*ac*, 121*bd* Connection line
201 Smartphone
202 Distance measuring module

What is claimed is:

1. A light receiving device, comprising:
a pixel that transfers a charge generated in a single photoelectric conversion unit to a predetermined FD in a case where a voltage of a predetermined value or more is simultaneously applied to gates of at least two transfer transistors.

2. The light receiving device according to claim 1, wherein
an ON period of the transfer transistors, which is a period during which a voltage of a predetermined value or more is applied to the gate, is shifted by half between the two transfer transistors.

3. The light receiving device according to claim 2, wherein
an ON period of the transfer transistor is twice an irradiation time of reflected light received by the single photoelectric conversion unit.

4. The light receiving device according to claim 1, wherein
the light receiving device is configured such that the charge is transferred to the single predetermined FD in a period in which a total value of voltages applied to gates of the two transfer transistors becomes a predetermined value or more.

5. The light receiving device according to claim 1, wherein the pixel includes four transfer transistors,
wherein the pixel is controlled to a state in which a voltage of a predetermined value or more is constantly applied to gates of first and second transfer transistors which are two transfer transistors facing each other among the four transfer transistors, and
wherein the pixel is configured such that a voltage of a predetermined value or more is alternately applied to gates of third and fourth transfer transistors, which are the other two transfer transistors facing each other, so that a voltage of a predetermined value or more is simultaneously applied to gates of three transfer transistors.

6. The light receiving device according to claim 1, wherein
the light receiving device is configured such that
a planar shape of a gate of the transfer transistor is an L shape, and
the charge is transferred to the predetermined FD through a gap region between gates of the two transfer transistors to which a voltage of a predetermined value or more is simultaneously applied.

7. The light receiving device according to claim 1, wherein
the light receiving device is configured such that
a planar shape of a gate of the transfer transistor is an L shape, and
the charge is transferred to the predetermined FD through a region under gates of the two transfer transistors to which a voltage of a predetermined value or more is simultaneously applied.

8. The light receiving device according to claim 1, wherein
the transfer transistor includes a vertical transistor.

9. The light receiving device of claim 1, wherein the light receiving device is a distance measuring device.

10. A light receiving device, comprising:
a pixel that transfers a charge generated in a photoelectric conversion unit to a predetermined FD in a case where a voltage of a predetermined value or more is simultaneously applied to gates of at least two transfer transistors,
wherein the pixel includes four transfer transistors, and
wherein the pixel is configured such that a voltage of a predetermined value or more is simultaneously applied to gates of two adjacent transfer transistors.

11. The light receiving device according to claim 10, wherein
the light receiving device is configured such that the charge is transferred to the predetermined FD through a gap region between the gates of the two adjacent transfer transistors to which a voltage of a predetermined value or more is simultaneously applied.

12. The light receiving device according to claim 10, wherein
a planar shape of the gate of the transfer transistor is a substantially right-angled triangular shape, and a right-angled portion of the substantially right-angled triangular shape is arranged on a center portion side of the photoelectric conversion unit.

13. The light receiving device according to claim 10, wherein
the pixel includes four FDs, and
the four FDs are arranged at corner portions of four corners of the photoelectric conversion unit having a rectangular shape.

14. The light receiving device according to claim 13, wherein
two FDs in a diagonal direction among the four FDs are electrically connected to each other.

15. The light receiving device according to claim 10, wherein
the four transfer transistors are configured such that voltages of a predetermined value or more are sequentially applied to gates thereof.

16. A light receiving device, comprising:
a pixel that transfers a charge generated in a photoelectric conversion unit to a predetermined FD in a case where a voltage of a predetermined value or more is simultaneously applied to gates of at least two transfer transistors, wherein the pixel includes four transfer transistors, wherein the pixel is controlled to a state in which a voltage of a predetermined value or more is constantly applied to a gate of a first transfer transistor that is one of the four transfer transistors, and wherein the pixel is configured such that a voltage of a predetermined value or more is applied to a transfer transistor adjacent to the first transfer transistor, so that a voltage of a predetermined value or more is simultaneously applied to gates of two transfer transistors.

17. The light receiving device according to claim 16, wherein the light receiving device further includes a second transfer transistor and a third transfer transistor facing each other as transfer transistors adjacent to the first transfer transistor, and is configured such that a voltage of a predetermined value or more is alternately applied to gates of the second and third transfer transistors.

18. The light receiving device according to claim 16, wherein an ON period that is a period during which a voltage of a predetermined value or more is applied to a gate of a transfer transistor adjacent to the first transfer transistor is during an irradiation time of reflected light received by the photoelectric conversion unit.

19. The light receiving device according to claim 16, wherein a fourth transfer transistor facing the first transfer transistor is configured to be controlled constantly to an inactive state.

20. The light receiving device according to claim 19, wherein the light receiving device is configured such that a negative bias is constantly applied to a gate of the fourth transfer transistor.

* * * * *